(12) United States Patent
Miyatake et al.

(10) Patent No.: US 11,349,583 B2
(45) Date of Patent: May 31, 2022

(54) PROROGATION ENVIRONMENT RECOGNITION METHOD AND PROPAGATION ENVIRONMENT RECOGNITION APPARATUS

(71) Applicant: Nippon Telegraph and Telephone Corporation, Tokyo (JP)

(72) Inventors: Ryo Miyatake, Tokyo (JP); Kohei Suzaki, Tokyo (JP); Yusuke Asai, Tokyo (JP); Hiroyuki Shiba, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/973,631

(22) PCT Filed: Jun. 5, 2019

(86) PCT No.: PCT/JP2019/022340
§ 371 (c)(1),
(2) Date: Dec. 9, 2020

(87) PCT Pub. No.: WO2019/239983
PCT Pub. Date: Dec. 19, 2019

(65) Prior Publication Data
US 2021/0250110 A1    Aug. 12, 2021

(30) Foreign Application Priority Data

Jun. 13, 2018   (JP) .............................. JP2018-113162

(51) Int. Cl.
*H04B 17/391* (2015.01)
*H04B 17/309* (2015.01)
*G01S 13/89* (2006.01)

(52) U.S. Cl.
CPC ............ *H04B 17/391* (2015.01); *G01S 13/89* (2013.01); *H04B 17/309* (2015.01)

(58) Field of Classification Search
CPC .. H04B 17/391; H04B 17/309; H04B 17/318; H04B 17/336; H04B 17/29; G01S 13/89;
(Continued)

(56) References Cited

U.S. PATENT DOCUMENTS

2005/0003827 A1*  1/2005  Whelan ................. H04W 16/10
                                                                 455/454
2018/0287870 A1* 10/2018  Yerramalli ............ H04W 28/20
2018/0288630 A1* 10/2018  Guirguis ............... H04W 24/10

FOREIGN PATENT DOCUMENTS

JP    2008-288812    11/2008
JP    2015-109509    6/2015

OTHER PUBLICATIONS

Hashimoto et al., "Statistical Model of Indoor Radio Propagation Loss Using Geometrical-optical Space Classification," National Institute of Electronics, Information and Communication Technology, Technical Report, 2016, J99-B(9):684-692, 19 pages (with English Translation).

(Continued)

*Primary Examiner* — Fred A Casca
(74) *Attorney, Agent, or Firm* — Fish & Richardson P.C.

(57) ABSTRACT

A measuring robot (1) measures radio waves using a radio wave measuring unit (11) at a measurement point. A self-propelled route control unit (14) controls, in a case that reliability of communication using the radio wave at the measurement point is determined to be low based on one or more of a measurement result by the radio wave measuring unit (11) and information on an obstacle detected by a terrain/obstacle/position detection sensor unit (12), a radio wave measuring unit (11) to measure the radio wave more precisely compared to the measurement of the electromag- (Continued)

netic wave in a case that the reliability of the communication using the radio wave is determined to be high.

6 Claims, 23 Drawing Sheets

(58) Field of Classification Search
CPC ....... H04W 24/00; H04W 24/10; H04W 4/33; H04W 64/00; H04W 16/14; H04W 16/20
See application file for complete search history.

(56) References Cited

OTHER PUBLICATIONS

So et al., "Delay Performance Evaluation under Interference from Other System of Highly Reliable and Low Latency Radio Access Scheme by Utilizing Duplicate Transactions," National Institute of Electronics, Information and Communication Technology, Technical Report, Jul. 2017, pp. 155-160, 13 pages (with English Translation).

* cited by examiner

| (PROCEDURE 1) CLASSIFY RSSI RANGE | (PROCEDURE 2) DETERMINE COMMUNICATION STABILITY | (PROCEDURE 3) STORE DETERMINATION RESULT | (PROCEDURE 4) PROCESS BASED ON DETERMINATION RESULT |
|---|---|---|---|
| (CLASS A) ALL OF RSSI RANGES FALL WITHIN UNCOMMUNICABLE RANGE A | COMMUNICATION IS NOT POSSIBLE | STORE RESULT | TRAVEL TO NEXT MEASUREMENT POINT WITHOUT MEASURING PER |
| (CLASS B) PORTION OR ALL OF RSSI RANGE FALL WITHIN COMMUNICATION STABILITY CONFIRMATION RANGE B | COMMUNICATION STABILITY NEED TO BE DETERMINED BY PER | STORE RESULT | ADDITIONALLY MEASURE PER, STORE PER, AND THEN, TRAVEL |
| (CLASS C) ALL OF RSSI RANGES FALL WITHIN COMMUNICABLE RANGE C | COMMUNICATION IS STABLE | STORE RESULT | TRAVEL TO NEXT MEASUREMENT POINT WITHOUT MEASURING PER |

Fig. 22

PROROGATION ENVIRONMENT RECOGNITION METHOD AND PROPAGATION ENVIRONMENT RECOGNITION APPARATUS

CROSS-REFERENCE TO RELATED APPLICATIONS

This application is a National Stage application under 35 U.S.C. § 371 of International Application No. PCT/JP2019/022340, having an International Filing Date of Jun. 5, 2019, which claims priority to Japanese Application Serial No. 2018-113162, filed on Jun. 13, 2018. The disclosure of the prior application is considered part of the disclosure of this application, and is incorporated in its entirety into this application.

TECHNICAL FIELD

The present invention relates to a propagation environment recognition method and a propagation environment recognition apparatus.

BACKGROUND ART

The increase in communication traffic is straining frequency resources. In such a situation, there is a demand for communication methods that increase frequency utilization efficiency and reliable communication methods that ensure Quality of Service (QoS). However, in actual communication environments, signal quality vanes greatly due to various factors such as fading or interference which cause throughput reduction, delay time increase, and the like. Therefore, in order to perform communication with high reliability and low latency, a radio scheme for simultaneously using a plurality of bands has been proposed (see Non Patent Literature 1, for example).

It is assumed that the maximum use of the frequency in this manner will continue in the future. In order to efficiently utilize the frequency, control of communication resources such as switching the frequency bands used and changing the communication scheme is important. In this communication resource control, it is necessary to appropriately recognize a radio wave usage state, and a radio wave environment recognition technique using a statistical model has been proposed (see Non Patent Literature 2, for example).

CITATION LIST

Non Patent Literature

Non Patent Literature 1: Hideya So, and other four, "Delay Performance Evaluation under Interference from Other System of Highly Reliable and Low Latency Radio Access Scheme by Utilizing Duplicated Transmissions", Institute of Electronics, Information and Communication Engineers, Technical Report, RCC2017-42, pp. 155-160, July, 2017 Non Patent Literature 2: Thakahiro Hashimoto, and other three, "Statistical model of indoor radio wave propagation loss using a geometrically spatial classification", Institute of Electronics, Information and Communication Engineers. Transactions on Communications B, Vol. J99-B, No. 9, pp. 684-692, 2016

SUMMARY OF THE INVENTION

Technical Problem

It is important to appropriately statistically model the communication environment used for communication resource control and the like.

However, as mentioned above, radio communication environments involve many uncertain elements in real situations, such as multipath fading, shadowing, free space loss due to a distance, and interference by other terminals. Therefore, it is difficult to perform appropriate modeling for each environment.

There are also simulation based methods such as ray tracing for obtaining deterministic propagation environments, but calculation and processing are enormous and require a detailed spatial model. Furthermore, calculation and processing at each terminal is difficult because the calculation results are very large vector data.

In light of the foregoing, an object of the present invention is to provide a propagation environment recognition method and a propagation environment recognition apparatus capable of recognizing a propagation environment of electromagnetic waves with a reduced amount of calculation.

Means for Solving the Problem

An aspect of the present invention is a propagation environment recognition method performed by a propagation environment recognition apparatus for measuring an electromagnetic wave, the propagation environment recognition method comprising performing measurement of an electromagnetic wave at a measurement point, and performing control including, in a case that reliability of communication using the electromagnetic wave at the measurement point is determined to be low based on one or more of a measurement result from the performing the measurement of the electromagnetic wave and information on an obstacle detected by a sensor, performing measurement of the electromagnetic wave more precisely compared to measurement of the electromagnetic wave in a case that the reliability of the communication using the electromagnetic wave is determined to be high.

An aspect of the present invention is the propagation environment recognition method described above, in which, in the case that the reliability at the measurement point is determined to be low, the performing control includes increasing the number of measurement points in a surrounding area to exceed the number of the measurement points in the case that the reliability is determined to be high, measuring another measurement item in addition to a measurement item of the electromagnetic wave for the case that the reliability is determined to be high; or measuring another measurement item different from the measurement item for the case that the reliability is determined to be high.

An aspect of the present invention is the propagation environment recognition method described above, in which the performing control includes determining the reliability of the communication at the measurement point using one or more of a reception level of the electromagnetic wave, a reception level at each of a plurality of frequencies, whether or not a line-of-sight from a source of the electromagnetic wave is established at the measurement point, a delay profile of the electromagnetic wave, an arrival direction of the electromagnetic wave, and a position, shape, material, and movement of the obstacle detected by the sensor.

An aspect of the present invention is the propagation environment recognition method described above, in which the performing the measurement includes measuring a reception level at the measurement point, and the performing control includes determining the reliability of the communication at the measurement point based on the measured reception level, and measuring an error rate in addition to the reception level in a case that the reliability of the communication is determined to be low.

An aspect of the present invention is the propagation environment recognition method described above, in which the performing control includes calculating a delay profile at the measurement point using the measurement result from the performing the measurement, and determining the reliability of the communication based on a delay time spread indicated by the calculated delay profile.

An aspect of the present invention is the propagation environment recognition method described above, in which the performing the measurement includes measuring the electromagnetic wave at a plurality of measurement points on a route along which the propagation environment recognition apparatus travels.

An aspect of the present invention is a propagation environment recognition apparatus comprising a measuring unit configured to measure an electromagnetic wave at a measurement point, and a control unit configured to control, in a case that reliability of communication using the electromagnetic wave at the measurement point is determined to be low based on one or more of a measurement result by the measuring unit and information on an obstacle detected by a sensor, the measuring unit to measure the electromagnetic wave more precisely compared to the measurement of the electromagnetic wave in a case that the reliability of the communication using the electromagnetic wave is determined to be high.

Effects of the Invention

According to the present invention, it is possible to recognize a communication environment with a reduced amount of calculation.

BRIEF DESCRIPTION OF DRAWINGS

FIG. 22 is a diagram summarizing processing procedures according to the ninth embodiment.

DESCRIPTION OF EMBODIMENTS

Hereinafter, embodiments of the present invention will be described in detail with reference to the drawings.

Figure 1:
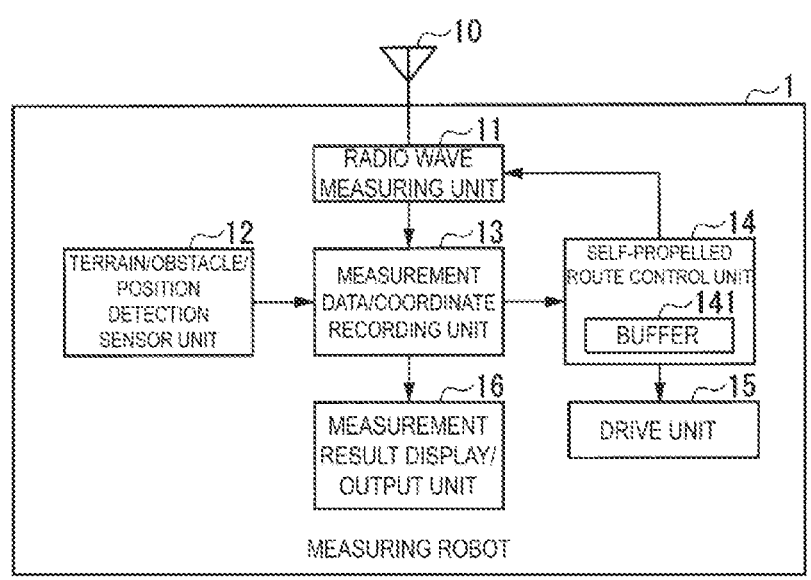
FIG. 1 is a diagram illustrating a configuration of a measuring robot according to an embodiment of the present invention.

FIG. 1 is a diagram illustrating a configuration of a measuring robot 1 according to an embodiment of the present invention. The measuring robot 1 is an example of a propagation environment recognition apparatus. The measuring robot 1 includes an antenna 10, a radio wave measuring unit 11, a terrain/obstacle/position detection sensor unit 12, a measurement data/coordinate recording unit 13, a self-propelled route control unit 14, a drive unit 15, and a measurement result display/output unit 16.

The antenna 10 transmits and receives radio waves. The antenna 10 may be an omniantenna or a directional antenna. The radio wave measuring unit 11 has a function to measure a reception quality of a radio signal received by the antenna 10 by way of a radio wave, and a function to acquire identification information of a transceiver from the radio signal. The reception quality may include, for example, a Received Signal Strength (RSSI (Received Signal Strength Indicator)), a Bit Error Rate (BER), a Packet Error Rate (PER), a throughput, modulation parameters (Modulation and Coding Scheme (MCS)), a Carrier to Noise Ratio (C/N (Carrier to Noise Rati)), a Signal-to-Noise Ratio (S/N), a Signal to Interference Ratio (SI), and the like. The identification information of the transceiver is a Medium Access Control (MAC) address, a Service Set Identifier (SSID), or the like. Furthermore, the radio wave measuring unit 11 performs simultaneous acquisition of a plurality of points, directivity and polarization control, delay profile acquisition, channel estimation result (frequency axis) delay distribution, and Doppler frequency acquisition, using a plurality of antennas 10. Furthermore, the radio wave measuring unit 11 may have a mechanism that enables changes in positions (lateral, height, depth, and angle) of the antenna 10 freely, for radio wave measurement.

The terrain/obstacle/position detection sensor unit 12 includes one or more of an image acquisition device, a map creation and self-location estimation device, a distance determination device, and an obstacle and position detection device. The terrain/obstacle/position detection sensor unit 12 outputs terrain/obstacle/position detection data that is configured with data obtained, detected, or created by these devices to the measurement data/coordinate recording unit 13. The image acquisition device acquires image data. The image acquisition device includes, for example, a still or moving image camera, a depth cameras, a thermography, and the like. The map creation and self-location estimation device uses a two-dimensional or three-dimensional laser range finder, a camera, a laser range finder, and the like to create a map or estimate a self-location based on a Simultaneously Localization and Mapping (SLAM) algorithm. The distance determination device detects a distance between a target object and the measuring robot 1. The distance detection device is an ultrasonic sensor, for example. The obstacle and position detection device detects positions and terrains of an obstacle around the measuring robot 1 and of the measuring robot 1. The obstacle and position detection device includes a Global Positioning System (GPS), an infrared radiation sensor, and the like, for example.

Note that the SLAM is described in "http://dse.ssi.ist-.hokudai.ac.jp/~onosato/SSI-IS2006/Report/term14/index-.html" and "https://www.youtube.com/watch?v=NMFsEpVppZM".

The measurement data/coordinate recording unit 13 converts information such as a position of the measuring robot 1 (hereinafter, also referred to as a self-location) indicated by the terrain/obstacle/position detection data output from the terrain/obstacle/position detection sensor unit 12 and a position of the obstacle into coordinates. The measurement data/coordinate recording unit 13 associates the measurement data observed by the radio wave measuring unit 11 with a coordinate position of a position and time information when that measurement data is observed, and records the resultant. Further, the measurement data/coordinate recording unit 13 associates the terrain/obstacle/position detection data with the time information, and stores the resultant.

The self-propelled route control unit 14 computes a self-propelled route avoiding the obstacle based on the information recorded in the measurement data/coordinate recording unit 13, and outputs control information, with which the computed self-propelled route may be taken, to the drive unit 15. The self-propelled route control unit 14 includes a buffer 141. The buffer 141 is a delay element. The buffer 141 temporarily holds, and then, outputs data read out from the measurement data/coordinate recording unit 13.

The self-propelled route control unit 14 determines a level of confidence of a communication quality at a current measurement point, based on the data read out form the measurement data/coordinate recording unit 13. The self-propelled route control unit 14 controls the radio wave measuring unit 11 or the self-propelled route control unit 14 to make the more precise (extensive) measurement in a case that the level of confidence is low than in a case that the level of confidence is high. This allows the measurement to be completed earlier as compared to a case of precisely measuring all measurement target areas.

The precise measurement may be made by, for example, increasing the number of measurement items, changing the measurement item to another measurement item that involves the precise measurement, increasing the number of measurement points to increase a spatial density for the measurement, and the like. In the case of increasing the number of measurement items, or in the case of changing the measurement item, the self-propelled route control unit 14 instructs the radio wave measuring unit 11. The precise measurement performed by the radio wave measuring unit 11 requires longer time compared to an easy or normal measurement, and thus, if the precise measurement is needed, the self-propelled route control unit 14 reduces a travel speed, or generates a control signal for stopping to output the generated signal to the drive unit 15.

Increase or decrease of the spatial density for the measurement can be controlled by changing a running speed. For example, in a case that the radio wave measuring unit 11 makes the measurement at a substantially constant time interval, the self-propelled route control unit 14 reduces the travel speed to increase the number of measurement points per the same area more than when the travel speed is high, enabling the measurement at a fine spatial resolution. The detailed operations of the self-propelled route control unit 14 are described later in the embodiments.

The drive unit 15 operates a drive mechanism in accordance with an instruction based on the control information from the self-propelled route control unit 14. The drive mechanism is a moving measure such as a wheel, a caterpillar, two-legged locomotion, four-legged locomotion, and flight. The drive unit 15, in the radio wave measurement, also includes a means for performing position correction, vibrational/shake correction, and the like in conjunction with the terrain/obstacle/position detection sensor unit 12.

The measurement result display/output unit 16 displays coordinate information and radio wave measurement information finally obtained, and time information on a display, or outputs the relevant information to another device or the like. The radio wave measurement information is generated from the measurement data. For example, the radio wave measurement information include a heat map of the RSSI, measurement results of the BER and PER at each point, positions and directions of, and propagation paths of radio waves from, an access point (AP) or interference source. The measurement result display/output unit 16 displays and outputs the radio wave measurement information together with surrounding environment and layout information observed by the terrain/obstacle/position detection sensor unit 12.

The embodiments in the following describe in detail processes in which the self-propelled route control unit 14 in the measuring robot 1 illustrated in FIG. 1 makes radio wave environment measurement in accordance with the self-propelled route.

First Embodiment

In a first embodiment, the measuring robot 1 changes the measurement items for radio wave based on a reception level such as the RSSI, and measures also the BER, the PER and the like.

The self-propelled route control unit 14 in the measuring robot 1 decides the next moving position and travel direction for the measuring robot 1 using various pieces of measurement data to control the drive unit 15. The decision on the self-propelled route at this time may be made using the radio wave measurement information besides the terrain/obstacle/position information.

Hereinafter, processing that is based on the radio wave measurement information is described.

To acquire the BER, PER of about $10^{-3}$ points at each measurement point, it is necessary, in order to take reliable data, to acquire, per a measurement point, data of $10^5$ bits for the BER and data of $10^5$ packets (packet length example: 100 bits×$10^5$ packets=$10^7$ bits) for the PER. In a case of a communication rate of 100 kbps (kilobits per second), time taken per one measurement point is one second for the BER and 100 seconds for the PER, and during this measurement, the traveling needs to be interrupted, resulting in a huge amount of measurement time.

In radio communication, when the carrier to noise ratio (C/N) is deteriorated, a bit error occurs. A noise at a receiving terminal is generally constant although it may slightly change depending on an environmental temperature. Thus, a carrier power can be approximately estimated by referring to an RSSI value. As such, in a case that the RSSI value falls below a lower limit threshold $\alpha 1$ or exceeds an upper limit threshold $\alpha 2$, the self-propelled route control unit 14 does not measure the BER or the PER, and instructs the drive unit 15 to continue traveling The lower limit threshold $\alpha 1$ is a value for determining an RSSI indicating that communication is obviously impossible, and the upper limit threshold $\alpha 2$ is a value for determining an RSSI indicating that communication is obviously possible. On the other hand, in a case that the RSSI value exceeds that threshold $\alpha 1$ and falls below the threshold $\alpha 2$, the self-propelled route control unit 14 outputs a stop command to the drive unit 15 in order to measure the BER an the PER and instructs the radio wave measuring unit 11 to acquire the BER and the PER. This can reduce the number of measurement points, and thus, the measurement time can be reduced.

The radio wave measuring unit 11 may directly measure the carrier to noise ratio (C/N), the modulation signal parameters (MCS), the throughput information and the like, and in a case that the self-propelled route control unit 14 can acquire measurement results thereof, the self-propelled route control unit 14 may use the acquired results as the reference in place of the RSSI. Note that the more an amount of packets transmitted, the more the throughput information is averaged. As such, the radio wave measuring unit 11 may continue a simple throughput measurement using a small amount of packets and so on, and the self-propelled route control unit 14 may be configured to output the stop instruction to the drive unit 15 to determine the accurate throughput value only when the throughput falls below the threshold. This is the same for the RSSI value, the C/N, the MCS, and the like. Note that the self-propelled route control unit 14 requests a radio wave source to transmit a bit or packet for measurement, but does not necessarily request the radio wave transmission from the radio wave source in a case of measuring the parameter that does not need to be demodulated such as the RSSI.

Figure 2:
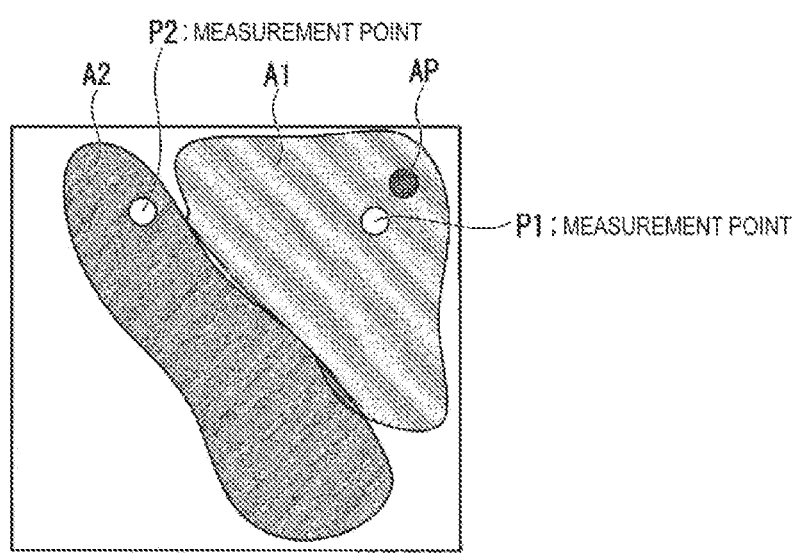
FIG. 2 is a diagram illustrating an example of an area in which a measuring robot measures a propagation environment according to a first embodiment.

FIG. 2 is a diagram illustrating an example of an area in which the measuring robot 1 measures a propagation environment according to the present embodiment. An area A1 is an area which is near the access point (AP) and in which the reception level of radio waves from the access point is high. When the measuring robot 1 is located at a measurement point P1 in the area A1, the measuring robot 1 determines that a certain degree of communication quality is secured, and measures only the reception level such as the RSSI. On the other hand, an area A2 is an area which is farther from the access point than the area A1 and in which the reception level of radio waves from the access point is low. When the measuring robot 1 is located at a measurement point P2 in the area A2, the measuring robot 1 acquires the BER, the PER, and the like, in consideration of the possibility of low communication quality.

Figure 3:
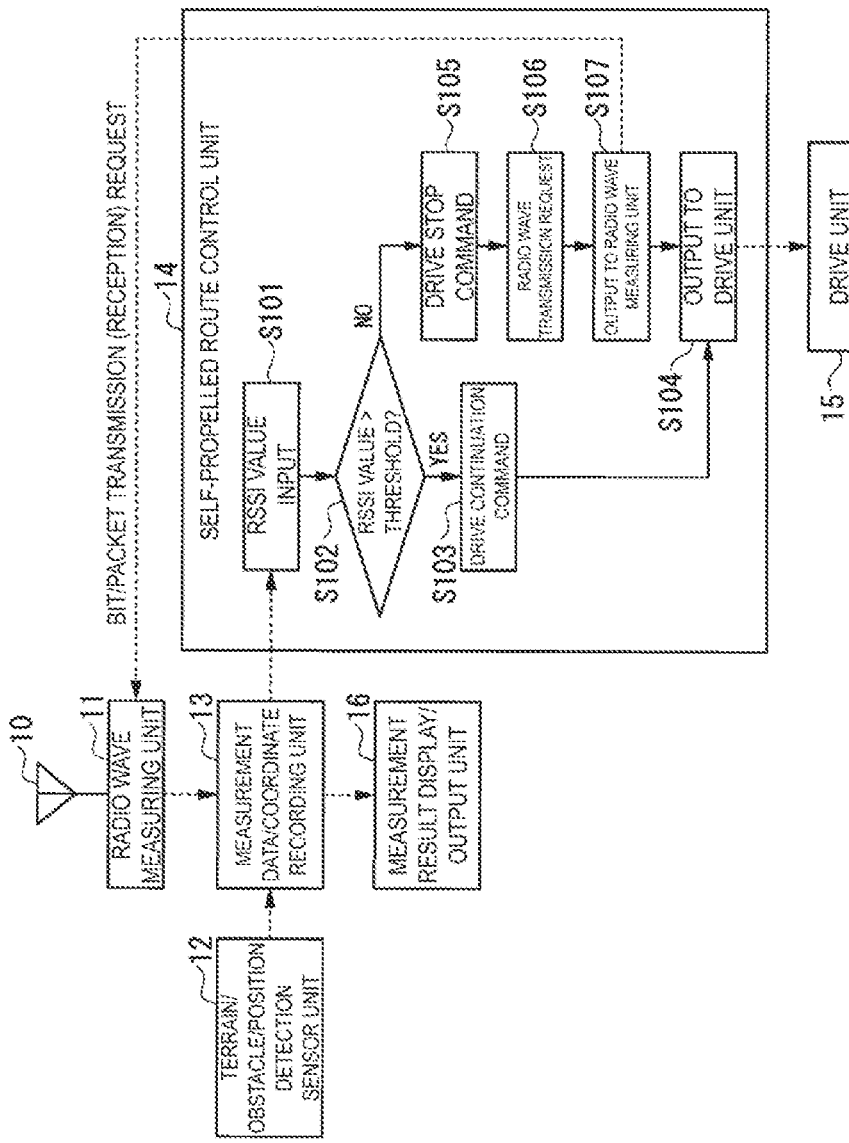
FIG. 3 is a flow diagram illustrating processing of a self-propelled route control unit according to the first embodiment.

FIG. 3 is a flow diagram illustrating an example of processing of the self-propelled route control unit 14 according to the present embodiment. The self-propelled route control unit 14 inputs the RSSI value at a current self-location from the measurement data/coordinate recording unit 13 (step S101). The self-propelled route control unit 14 determines whether the RSSI value exceeds the threshold (step S102). In a case that the self-propelled route control unit 14 determines that the RSSI value exceeds the upper limit threshold (step S102: YES), the self-propelled route control unit 14 generates a drive continuation command with respect to the drive unit 15 (step S103), and outputs the generated command to the drive unit 15 (step S104). The drive unit 15 continues traveling in accordance with the drive continuation command.

On the other hand, in a case that the self-propelled route control unit 14 determines that the RSSI value is equal to or less than the upper limit threshold (step S102: NO), the self-propelled route control unit 14 generates a control signal for a drive stop command with respect to the drive unit 15 (step S105). Furthermore, the self-propelled route control unit 14 generates a radio wave transmission request or a radio wave reception request, the radio wave transmission request requesting a radio wave transmission source (access point, base station, or the like) to transmit a bit or packet or the like for measuring the BER, the PER, and the like, the radio wave reception request requesting the radio wave measuring unit 11 to receive a bit or packet for measurement (step S106), and outputs the generated requests to the radio wave measuring unit 11 (step S107). The self-propelled route control unit 14 outputs the drive stop command generated in step S105 to the drive unit 15 (step S108). The drive unit 15 stops running in accordance with the drive stop command. The radio wave measuring unit 11 transmits the radio wave transmission request to the radio wave transmission source by way of radio waves, and measures the BER, the PER, and the like of the radio waves received from the radio wave transmission source in response to the radio wave transmission request. Alternatively, the radio wave measuring unit 11 receives radio waves from the radio wave transmission source in accordance with the radio wave reception request, and measures BER, the PER, and the like. After completion of the measurement, the self-propelled route control unit 14 outputs a control signal indicating the resumption of running to the drive unit 15.

Note that, the self-propelled route control unit 14 may perform the process of step S103 in a case of determining in step S102 that the RSSI value exceeds the upper limit threshold or is less than the lower threshold, and may perform the process of step S105 in a case of determining in step S102 that the RSSI value is equal to or less than the upper limit threshold or is equal to or more than the lower limit threshold. Alternatively, the self-propelled route control unit 14 may perform the process of step S103 in a case of determining in step S102 that the RSSI value is less than the lower threshold, and may perform the process of step S105 in a case of determining in step S102 that the RSSI value is equal to or more than the lower limit threshold.

According to the present embodiment, the measuring robot 1 measures the BER and the PER of the area exclusively in which the reception level of the signal is low, and thus, the measurement time can be reduced compared to the case of measuring the BER and the PER of the all measurement target areas.

Second Embodiment

In a second embodiment, the measuring robot 1 changes a measurement interval or the like in accordance with a reception level variation, for example, an amount of variation of the RSSI value. Thus, the self-propelled route control unit 14 inputs the RSSI values measured by the radio wave measuring unit 11, and observes the variation (differential) of the RSSI values. The self-propelled route control unit 14 increases the measurement interval (or increases the travel speed) in a case that a difference or differential value is small between a measurement value $S(t1)$ at a current time t1 and a previous measurement value $S(t1-\Delta t)$ at a time $(t1-\Delta t)$ that is $\Delta t$ earlier than the current time. On the other hand, the self-propelled route control unit 14 decreases the measurement interval (or reduces the travel speed) in a case that the difference or differential value is large between the measurement value $S(t1)$ at the current time t1 and the previous measurement value $S(t1-\Delta t)$. This can decrease the number of measurement in the case that the reception level variation is small to allow the measured time to be reduced. Note that, in a case that a differential value variation is large, the self-propelled route control unit 14 may change the travel direction to precisely measure the proximity.

Figure 4:
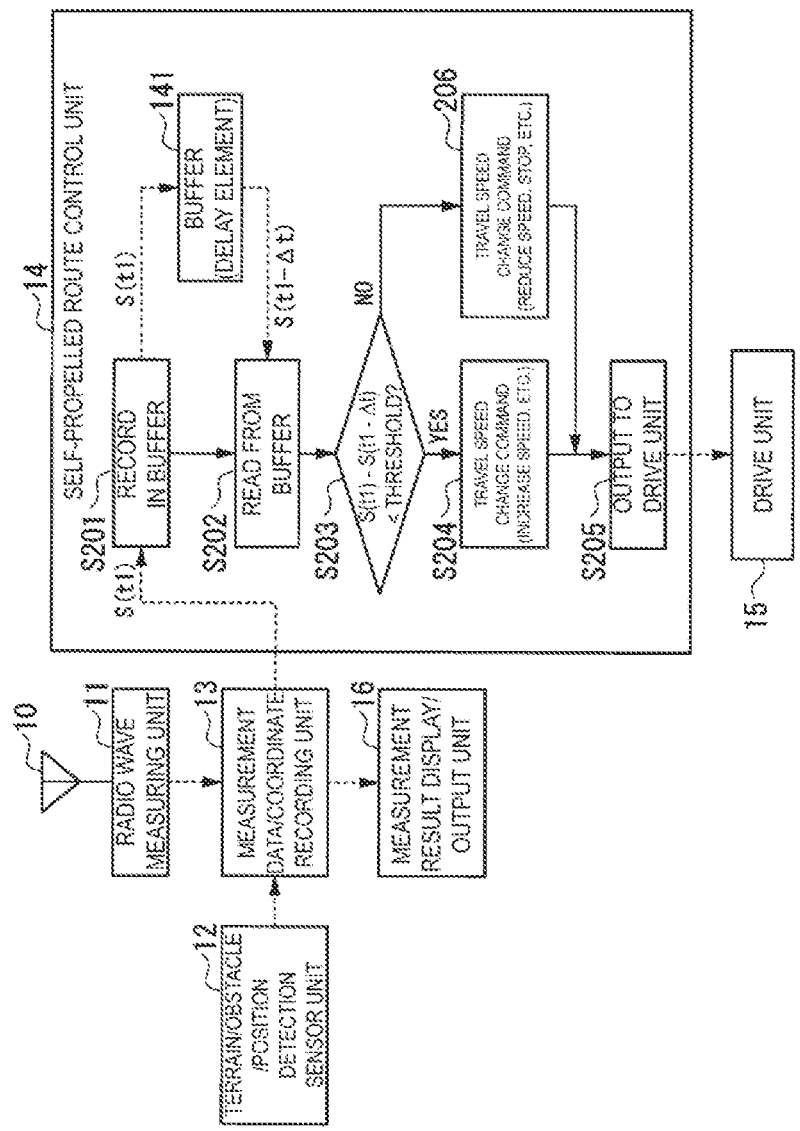
FIG. 4 is a flow diagram illustrating processing of a self-propelled route control unit according to a second embodiment.

FIG. 4 is a flow diagram illustrating an example of processing of the self-propelled route control unit 14 according to the second embodiment. The self-propelled route control unit 14 reads out the measurement data $S(t1)$ of the RSSI at the current time t1 from the measurement data/coordinate recording unit 13, and stores the read measurement data in the buffer 141 (step S201). The self-propelled route control unit 14 reads out the previous measurement data $S(t1-\Delta t)$ of the RSSI from the buffer 141 (step S202). The self-propelled route control unit 14 calculates the amount of variation from measurement data $S(t1)$—measurement data $S(t1-\Delta t)$, and determines whether or not the calculated amount of variation is less than the threshold (step S203).

In a case that the self-propelled route control unit 14 determines that the amount of variation is less than the threshold (step S203: YES), the self-propelled route control unit 14 decreases the measurement interval because the variation is small. Thus, the self-propelled route control unit 14 generates a travel speed change command to increase the travel speed (step S204), and outputs the generated command to the drive unit 15 (step S205). The drive unit 15 increases the travel speed in accordance with the travel speed change command. Note that when the current travel speed has reached an upper limit, the self-propelled route control unit 14 may generate a drive continuation command to maintain the current speed and output the generated command to the drive unit 15. Concerning the control in the case that the travel speed has reached the upper limit, the same applies to the following embodiments.

On the other hand, in a case that the self-propelled route control unit 14 determines that the amount of variation is equal to or more than the threshold (step S203: NO), the self-propelled route control unit 14 increases the measurement interval because the variation is large. Thus, the self-propelled route control unit 14 generates a travel speed change command to reduce the travel speed or stop (step S206), and outputs the generated command to the drive unit 15 (step S205). The drive unit 15 reduces the travel speed or stops in accordance with the travel speed change command, while the BER, the PER, and the like are measured. Note that in the case of reducing the travel speed, when the current travel speed has reached a lower limit, the self-propelled route control unit 14 may generate a drive continuation command to maintain the current speed and output the generated command to the drive unit 15. Concerning the control in the case that the travel speed has reached the lower limit, the same applies to the following embodiments.

According to the present embodiment, the measuring robot 1 determines reliability depending on the reception level variation, and when the reliability is low, the measuring robot 1 increases the number of the radio wave measurement points, and adds or changes the measurement items.

Third Embodiment

In a third embodiment, the measuring robot 1 estimates the environment in accordance with differences in signal qualities of a plurality of frequencies that are transmitted in multiple carriers. Specifically, the measuring robot 1 estimates whether the measuring robot 1 is in a line-of-sight or non-line-of-sight environment, or in the multipath environment or non-multipath environment, based on a level difference between carriers. The measuring robot 1 makes measurements that match the estimated environment, and the system and communication method to be estimated. For example, the measuring robot 1 decreases the measurement in a case of a communication method using a plurality of carriers even in a case of a multipath rich environment, and increases the measurement in a case of using a single carrier.

Figure 5:
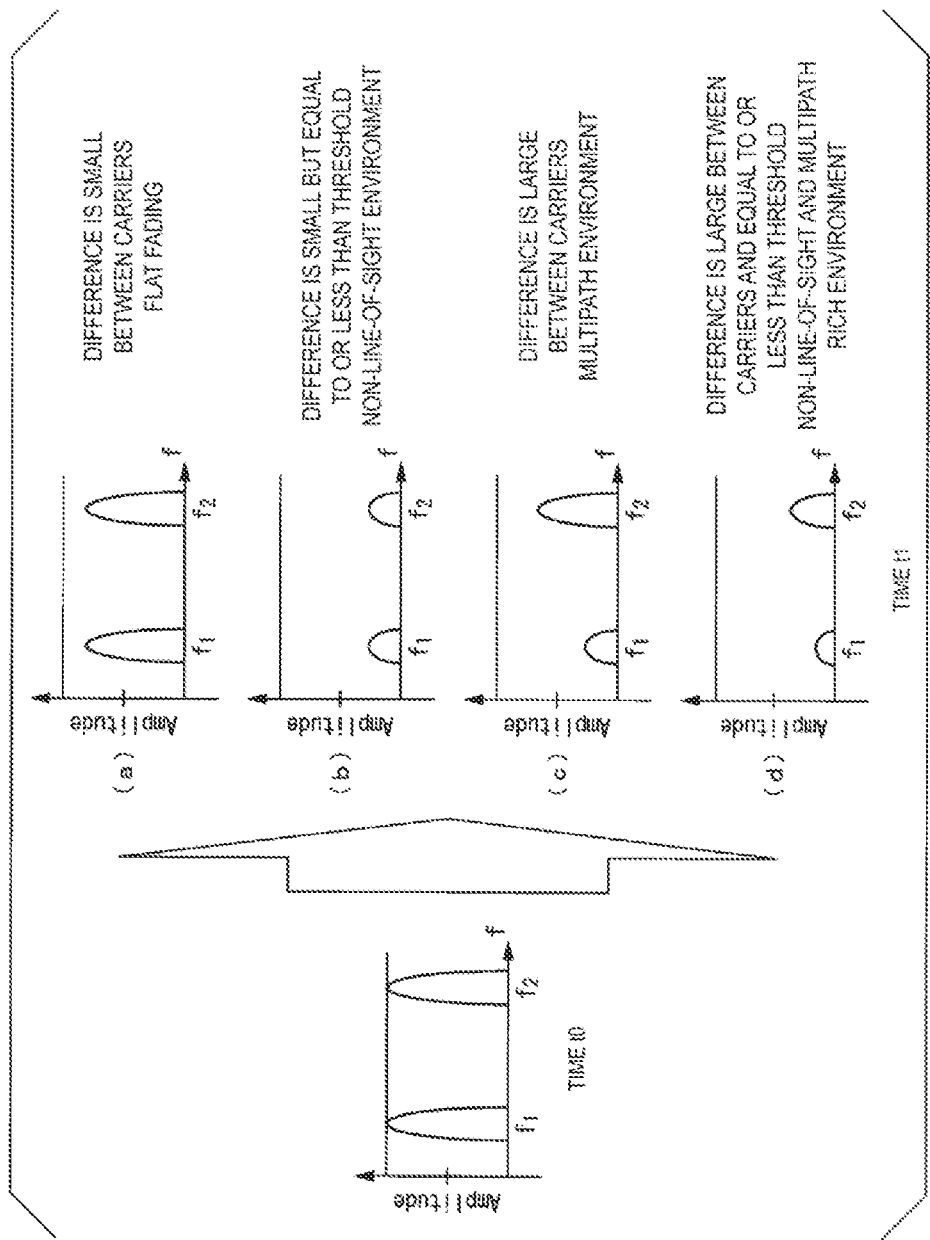
FIG. 5 is a diagram illustrating an example of an amplitude of a signal received by a measuring robot according to a third embodiment.

Using FIG. 5, an environment that is determined in accordance with the signal qualities of two different frequency carriers is described. In FIG. 5, a diagram on the left side is a diagram illustrating an example of an amplitude of a signal received by the measuring robot 1 according to the present embodiment. The amplitude represents the level of the signal. Both amplitudes of frequencies $f_1$ and $f_2$ of two carriers at a time to reach the threshold, and a difference between the amplitude of the frequency $f_1$ and the amplitude of the frequency $f_2$ is small.

As illustrated in FIG. 5(a), at a time $t_1$ after the time to, both amplitudes of the frequencies $f_1$ and $f_2$ exceed the threshold, and the difference between the amplitudes is small. In this case, the case is determined to be flat fading. As illustrated in FIG. 5(b), at the time $t_1$, the difference between the amplitudes of the frequencies $f_1$ and $f_2$ is small, and the amplitudes are equal to or less than the threshold. In this case, the case is determined to be the non-line-of-sight environment. As illustrated in FIG. 5(c), at a time $t_1$, both amplitudes of the frequencies $f_1$ and $f_2$ exceed the threshold, and the difference between the amplitudes is large. In this case, the case is determined to be a multipath rich environment. As illustrated in FIG. 5(d), at a time $t_1$, both amplitudes of the frequencies $f_1$ and $f_2$ are equal to or less than the threshold, and the difference between the amplitudes is large. In this case, the case is determined to be the non-line-of-sight environment and the multipath rich environment.

Figure 6:
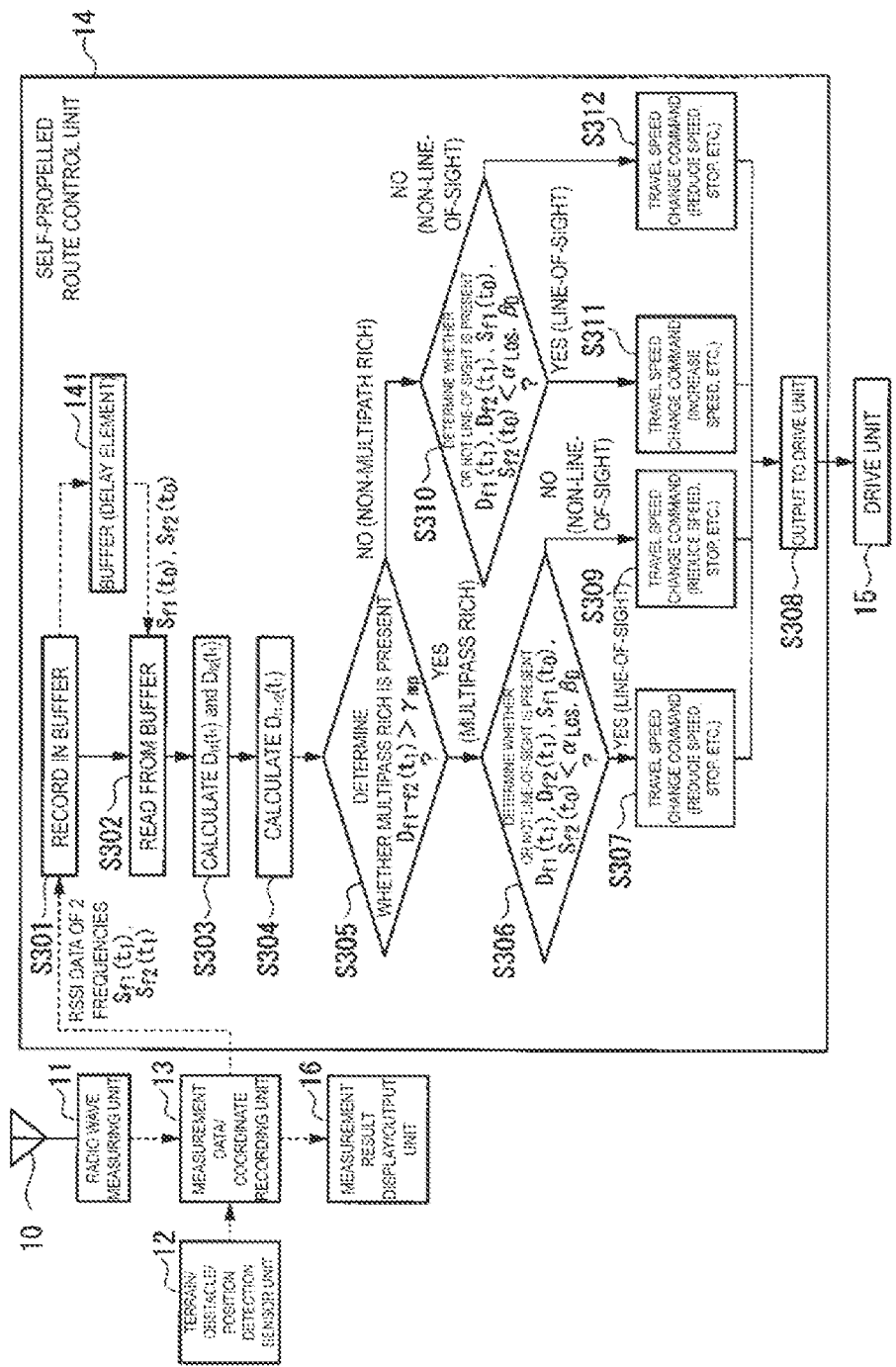
FIG. 6 is a flow diagram illustrating processing of a self-propelled route control unit according to the third embodiment.

FIG. 6 is a flow diagram illustrating an example of processing of the self-propelled route control unit 14 according to the present embodiment. The radio wave measuring unit 11 according to the present embodiment simultaneously acquires and measures radio waves of a plurality of frequencies received by the antenna 10. Here, a case that the frequencies of a measurement target are $f_1$ and $f_2$ is described as an example. Assume that the signal powers of the frequencies $f_1$ and $f_2$ at the time to are $S_{f1}(t_0)$ and $S_{f2}(t_0)$, and the signal powers of the frequencies $f_1$ and $f_2$ at time the $t_1$ are $S_{f1}(t_1)$ and $S_{f2}(t_1)$. Also, assume that $t_1 = t_0 + \Delta t$, where $\Delta t$ represents a minute time. Since the measuring robot 1 is traveling, measurement coordinates are slightly different between $t_0$ and $t_1$.

The self-propelled route control unit 14 reads from the radio wave measuring unit 11 the measurement data of the RSSI of $S_{f1}(t_1)$ and $S_{f2}(t_1)$ as the signal powers of two frequencies, frequencies $f_1$ and $f_2$ at the time $t_1$. The self-propelled route control unit 14 writes the RSSI values $S_{f1}(t_1)$ and $S_{f1}(t_1)$ into the buffer 141 (step S301). The self-propelled route control unit 14 reads from the buffer 141 the RSSI values $S_{f1}(t_0)$ and $S_{f2}(t_0)$ which are signal powers of two frequencies, frequencies $f_1$ and $f_2$ at the time to (step S302).

The self-propelled route control unit 14 sets an amount of time variation of the measurement value at the same frequency to $D_{f1}(t_1) = S_{f1}(t_1) - S_{f1}(t_0)$ in a case that the frequency of interest is $f_1$, and to $D_{f2}(t_1) = S_{f2}(t_1) - S_{f2}(t_0)$ in a case that the frequency of interest is $f_2$. The self-propelled route control unit 14 calculates $D_{f1}(t_1)$ and $D_{f2}(t_1)$ (step S303). The self-propelled route control unit 14 calculates the difference of the amounts of time variation between the frequencies $D_{f1-f2}(t_1) = D_{f1}(t_1) - D_{f2}(t_1)$ (step S304).

The self-propelled route control unit 14 compares $D_{f1-f2}(t_1)$, $D_{f1}(t_1)$, and $D_{f2}(t_1)$ with preset thresholds to estimate the radio wave environment. As the thresholds, a threshold $\gamma_{mp}$ for multipath determination, a threshold $\alpha_{LOS}$ for line-of-sight/non-line-of-sight determination, and a threshold $\beta_D$ for distance attenuation are used. Basically. $\alpha_{LOS} < \beta_D$ is set because the drop in a radio wave intensity due to the non-line-of-sight is greater than the drop due to the distance attenuation.

In order to estimate the radio wave environment, the self-propelled route control unit 14 determines whether or not the case is a multipath-rich environment, and determines whether the case is the line of sight or non-line-of-sight. Because frequency-selective fading occurs in a multipath rich environment, the case can be determined to be whether or not a multipath rich environment by comparing the values of $D_{f1-f2}(t_1)$ and $\gamma_{mp}$. Thus, first, the self-propelled route control unit 14 determines whether or not $D_{f1-f2}(t_1)$ is greater than $\gamma_{mp}$ (step S305). In a case that the self-propelled route control unit 14 determines that $D_{f1-f2}(t_1)$ is greater than $\gamma_{mp}$ and determines it is a multipath rich environment (step S305: YES), the self-propelled route control unit 14 determines whether the case is the line of sight or non-line of sight in step S306. In a case that the self-propelled route control unit 14 determines that $D_{f1-f2}(t_1)$ is equal to or less than $\gamma_{mp}$ and determines it is a non-multipath rich environment (step S305: NO), the self-propelled route control unit 14 determines whether the case is the line-of-sight or non-line-of-sight in step S310.

In the non-line-of-sight environment, it is believed that attenuation is larger compared to the line-of-sight environment. Thus, the self-propelled route control unit 14 compares the attenuation variation values $D_{f1}(t_1)$ and $D_{f2}(t_1)$ of the respective frequencies with $\alpha_{LOS}$ and $\beta_D$ to determine whether the case is the line-of-sight or non-line-of-sight. Note that, to determine whether the case is the line-of-sight or non-line-of-sight determination, a method using the absolute values of the received signals $S_{f1}(t_0)$ and $S_{f2}(t_0)$, in addition to the method using the differences (relative values) $D_{f1}(t_1)$ and $D_{f2}(t_1)$.

In a case that the self-propelled route control unit 14 determines that the case is a multipath rich environment (step S305: YES), the self-propelled route control unit 14 determines whether or not the RSSI values $S_{f1}(t_0)$ and $S_{f2}(t_0)$, and the attenuation variation values $D_{f1}(t_1)$ and $D_{f2}(t_1)$ are smaller than the threshold $\alpha_{LOS}$ and the threshold $\beta_D$ (step S306). In a case that the RSSI values $S_{f1}(t_0)$ and $S_{f2}(t_0)$, and the attenuation variation values $D_{f1}(t_1)$ and $D_{f2}(t_1)$ are smaller than the threshold $\alpha_{LOS}$ and the threshold $\beta_D$, the self-propelled route control unit 14 determines that the case is a line-of-sight environment (step S306: YES). The self-propelled route control unit 14 generates a travel speed change command to reduce the travel speed or stop (step S307) in order to make a measurement in an environment such as the one illustrated in FIG. 5(c), and outputs the generated command to the drive unit 15 (step S308).

On the other hand, in a case that at least one of the RSSI value $S_{f1}(t_0)$ or $S_{f2}(t_0)$, or the attenuation variation value $D_{f1}(t_1)$ or $D_{f2}(t_1)$ is larger than the threshold $\alpha_{LOS}$ or the threshold $\beta_D$, the self-propelled route control unit 14 determines that the case is a non-line-of-sight environment (step S306: NO). The self-propelled route control unit 14 generates a travel speed change command to reduce the travel speed or stop (step S309) in order to make a measurement in an environment such as the one illustrated in FIG. 5(d), and outputs the generated command to the drive unit 15 (step S308).

In a case that the self-propelled route control unit 14 determines that the case is a non-multipath rich environment (step S305: NO), the self-propelled route control unit 14 determines whether or not the RSSI values $S_{f1}(t_0)$ and $S_{f2}(t_0)$, and the attenuation variation values $D_{f1}(t_1)$ and $D_{f2}(t_1)$ are smaller than the threshold $\alpha_{LOS}$ and the threshold $\beta_D$ (step S310). In a case that the RSSI values $S_{f1}(t_0)$ and $S_{f2}(t_0)$, and the attenuation variation values $D_{f1}(t_1)$ and $D_{f2}(t_1)$ are smaller than the threshold $\alpha_{LOS}$ and the threshold $\beta_D$, the self-propelled route control unit 14 determines that the case is a line-of-sight environment (step S310: YES). The self-propelled route control unit 14 generates a travel speed change command to increase the travel speed (step S311) in order to make a measurement in an environment such as the one illustrated in FIG. 5(a), and outputs the generated command to the drive unit 15 (step S308).

On the other hand, in a case that at least one of the RSSI value $S_{f1}(t_0)$ or $S_{f2}(t_0)$, or the attenuation variation value $D_{f1}(t_1)$ or $D_{f2}(t_1)$ is larger than the threshold $\alpha_{LOS}$ or the threshold $\beta_D$, the self-propelled route control unit 14 determines that the case is a non-line-of-sight environment (step S310: NO). The self-propelled route control unit 14 generates a travel speed change command to reduce the travel speed or stop (step S312) in order to make a measurement in an environment such as the one illustrated in FIG. 5(b), and outputs the generated command to the drive unit 15 (step S308).

Note that the self-propelled route control unit 14 may use any of the RSSI values $S_{f1}(t_0)$ and $S_{f2}(t_0)$, and the attenuation variation values $D_{f1}(t_1)$, and $D_{f2}(t_1)$ for determinations of step S306 and step S310.

According to the determination described above, in the line-of-sight environment or the non-multipath rich environment, variation in the radio wave environment is small, and thus, a measurement distance and an interval between the measurement times are increased. In contrast, in the non-line-of-sight environment or the multipath rich environment, the variation in the radio wave environment relative to a distance is large, and thus, an additional processing such as making a measurement at small intervals may facilitate the measurement to be completed in an optimal time accordance with the environment. A map can also be created that represents which frequency band and which communication scheme are to be optimally used for the measurement area. Simultaneous acquisition of the map at a plurality of frequencies can reduce the measurement time.

Fourth Embodiment

In a fourth embodiment, the measuring robot 1 determines a radio wave measurement interval based on a positional relationship of the obstacles.

Figure 7:
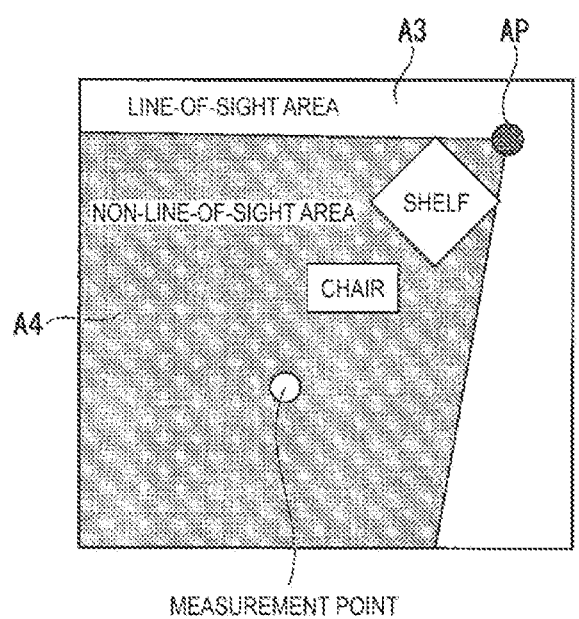
FIG. 7 is a diagram illustrating an example of an area in which a measuring robot measures a propagation environment according to a fourth embodiment.

FIG. 7 is a diagram illustrating an example of an area in which the measuring robot 1 measures a propagation environment according to the present embodiment. In the drawing, an access point (AP), and a shelf and a chair which are obstacles, are placed in a measurement target area. An area A3 is an area of line-of-sight environment (line-of-sight area) in which no obstacle is present between any point in the area and the access point, and an area A4 is an area of non-line-of-sight environment (non-line-of-sight area) in which an obstacle is present between any point in the area and the access point.

Information on positions of the access point or the interference source is input to the measuring robot 1. The measuring robot 1 calculates a line-of-sight (LOS) relationship or non-line-of-sight (NLOS) relationship of the radio wave at the measurement point by use of the terrain/obstacle/position detection data acquired by the terrain/obstacle/position detection sensor unit 12. The terrain/obstacle/position detection data includes information on a map and self-location created by the terrain/obstacle/position detection sensor unit 12 using the SLAM technique, and position on an obstacle position and self-location measured by the obstacle and position detection device. The LOS is a state in which no obstacle is present on a straight line connecting the transceivers or in a first Fresnel zone, and the NLOS is a state in which an obstacle is present on the straight line connecting the transceivers or in the first Fresnel zone. The measuring robot 1 acquires signals at the optimal measurement intervals depending on the line-of-sight environment or the non-line-of-sight environment determined based on the detected obstacle information. For example, the self-propelled route control unit 14 in the measuring robot 1 increases the radio wave measurement interval at a location that is determined to be in the line-of-sight, and decreases the radio wave measurement interval at a location that is determined to be the non-line-of-sight, and thus reduces the measurement time.

Thus, the self-propelled route control unit 14 calculates a straight line connecting the input position of the access point and the position of the obstacle measured by the terrain/obstacle/position detection sensor unit 12, and determines whether the position is in a line-of-sight or a non-line-of-sight using the calculated straight line and the self location. In a case of a system emphasizing reliability, the probability of radio wave arrival drops in a non-line-of-sight range, and thus, the extensive measurement is made. On the other hand, in a case of a system in which communication is difficult in the non-line-of-sight, such as a millimeter wave communication, the measurement itself is skipped for measurement time reduction.

Figure 8:
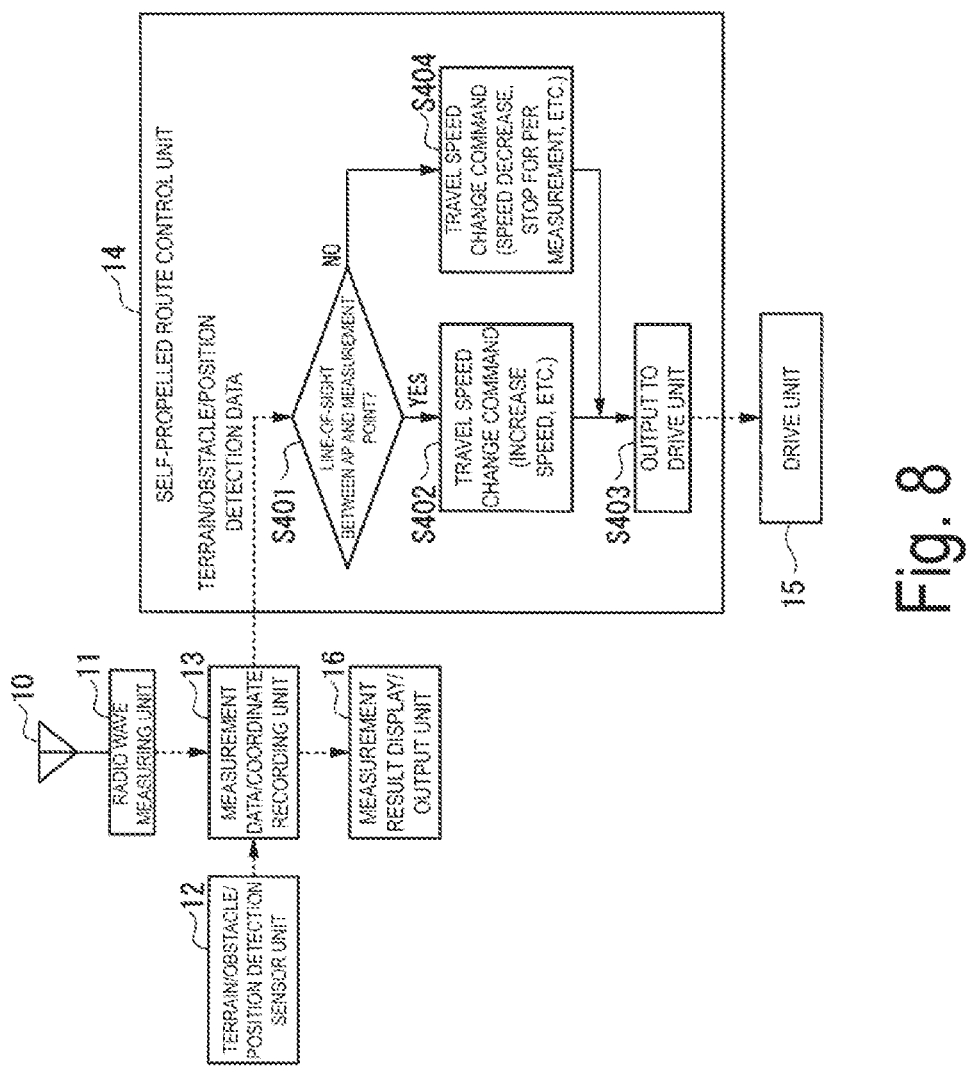
FIG. 8 is a flow diagram illustrating processing of a self-propelled route control unit according to the fourth embodiment.

FIG. 8 is a flow diagram illustrating an example of processing of the self-propelled route control unit 14 according to the present embodiment. The self-propelled route control unit 14 reads the information on the access point position, the terrain/obstacle/position detection data generated by the terrain/obstacle/position detection sensor unit 12 using the SLAM, and the measurement position (self location of the measuring robot 1). The self-propelled route control unit 14 determines whether or not a line-of-sight relationship holds in which a line-of-sight is achieved between the access point and the measurement point from the read information (step S401). In a case that the self-propelled route control unit 14 determines that the line-of-sight relationship holds (step S401: YES), the self-propelled route control unit 14 generates a travel speed change command to increase the travel speed (step S402), and outputs the generated command to the drive unit 15 (step S403). In a case that the self-propelled route control unit 14 determines that the line-of-sight relationship does not hold (step S401: NO), the self-propelled route control unit 14 generates a travel speed change command to decrease the travel speed or stop for measuring the PER (step S404), and outputs the generated command to the drive unit 15 (step S403).

According to the present embodiment, the measuring robot 1 calculates the line-of-sight area and the non-line-of-sight area using the positional relationship between the access point and the obstacle, and reduces the measurement time by reducing the number of measurements per unit time in the line-of-sight area compared to the non-line-of-sight area.

Fifth Embodiment

In a fifth embodiment, the measuring robot 1 determines a radio wave measurement interval depending on a positional relationship of the obstacles, and materials and shapes of the obstacles.

Figure 9:
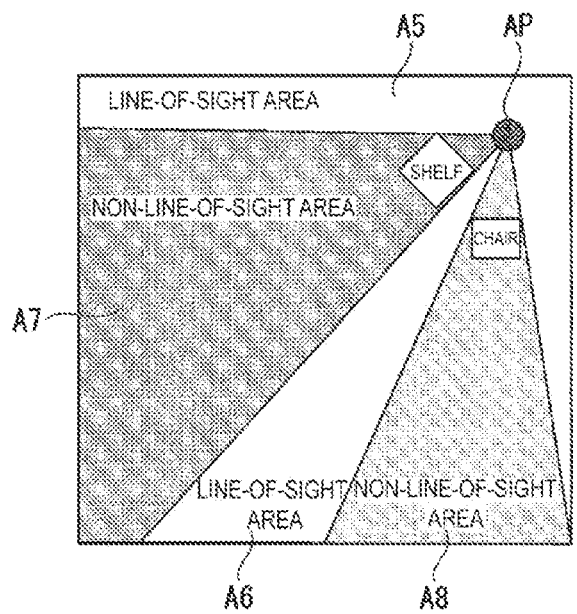
FIG. 9 is a diagram illustrating an example of an area in which a measuring robot measures a propagation environment according to a fifth embodiment.

FIG. 9 is a diagram illustrating an example of an area in which the measuring robot 1 measures a propagation environment according to the present embodiment. In the drawing, an access point (AP), and a shelf and a chair which are obstacles, are placed in a measurement target area. Each of areas A5 and A6 is a line-of-sight area in which no obstacle is present between any point in the area and the access point, an area A7 is a non-line-of-sight area in which the shelf is present between any point in the area and the access point, and an area A8 is a non-line-of-sight area in which the chair is present between any point in the area and the access point.

Information on positions of the access point or the interference source is input to the measuring robot 1. Similar to the fourth embodiment, the measuring robot 1 calculates a line-of-sight (LOS) relationship or non-line-of-sight (NLOS) relationship of the radio wave at the measurement point. The measuring robot 1 acquires signals at the optimal measurement intervals depending on the line-of-sight environment or the non-line-of-sight environment determined based on the detected obstacle information. For example, the self-propelled route control unit 14 in the measuring robot 1 reduces the measurement time by increasing the radio wave measurement interval in a place that is determined to be the line-of-sight environment, and by reducing the radio wave measurement interval in the place that is determined to be the non-line-of-sight environment. However, even in the non-line-of-sight environment, depending on the shape and material of the obstacle, an arrival signal level (RSSI), and the like, the arrival probability may vary. The measuring robot 1 skips the measurement for the non-line-of-sight area A7 because the signal level is low. In addition, the measuring robot 1 determines that an influence of the obstacle is low in the non-line-of-sight area A8, reduces the measurement time, and makes the extensive measurement.

Figure 10:
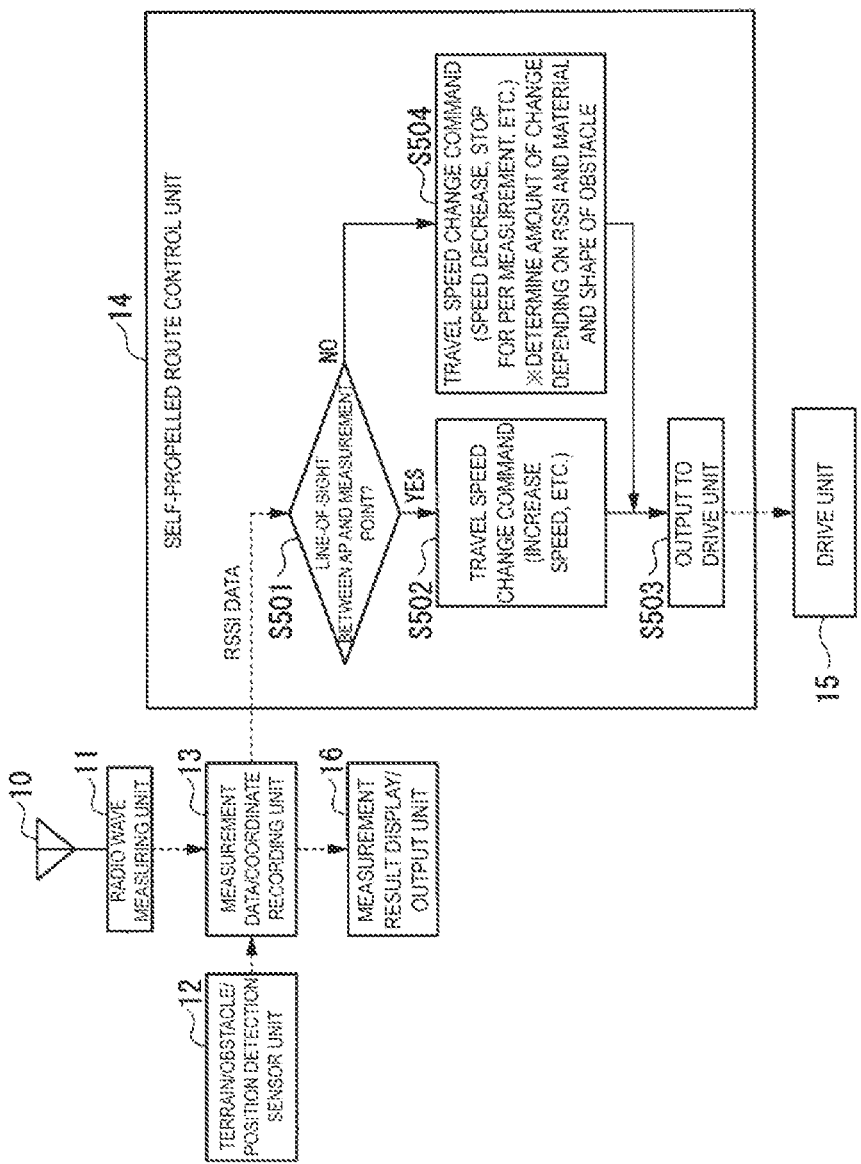
FIG. 10 is a flow diagram illustrating processing of a self-propelled route control unit according to the fifth embodiment.

FIG. 10 is a flow diagram illustrating an example of processing of the self-propelled route control unit 14 according to the present embodiment.

Similar to step S401 in the fourth embodiment illustrated in FIG. 8, the self-propelled route control unit 14 determines whether or not a line-of-sight relationship holds in which a line-of-sight is present between the access point (AP) and the measurement point (step S501). However, the terrain/obstacle/position detection data generated by the terrain/obstacle/position detection sensor unit 12 further includes information on the material and shape of the obstacle.

In a case that the self-propelled route control unit 14 determines that the line-of-sight relationship holds (step S501: YES), the self-propelled route control unit 14 generates a travel speed change command to increase the travel speed (step S502), and outputs the generated command to the drive unit 15 (step S503). On the other hand, in a case that the self-propelled route control unit 14 determines that the line-of-sight relationship does not hold (step S501. NO), the self-propelled route control unit 14 generates a travel speed change command to decrease the travel speed or stop for measuring the PER (step S54). At this time, the self-propelled route control unit 14 determines an amount of speed change depending on the RSSI and the material and shape of the obstacle. The self-propelled route control unit 14 outputs the travel speed change command generated in step S504 to the drive unit 15 (step S503).

According to the present embodiment, the measuring robot 1 calculates the line-of-sight area and the non-line-of-sight area using the positional relationship between the access point and the obstacle, and reduce the number of measurements per unit time in the line-of-sight area compared to the non-line-of-sight area. In addition, the measuring robot 1 increases the number of measurements per unit time in the non-line-of-sight area compared to the line-of-sight area, but reduces the number of measurements per unit time depending on the material and shape of the obstacle or the signal level. Thus, the measuring robot 1 reduces the measurement time.

Sixth Embodiment

In the sixth embodiment, the measuring robot 1 determines that the reliability at a measurement point is low in a case of detecting the presence of a moving object, such as a person, an animal, a vehicle, or the like, around the measurement point, and makes the extensive measurement. The measuring robot 1 sets the level of confidence in accordance with an amount of motion detected around the measurement point and the like, and as for the measurement data with a low level of confidence, the extensive measurement is made by increasing the number of acquisitions of the measurement results measurements average the measurement results, and the like.

Figure 11:
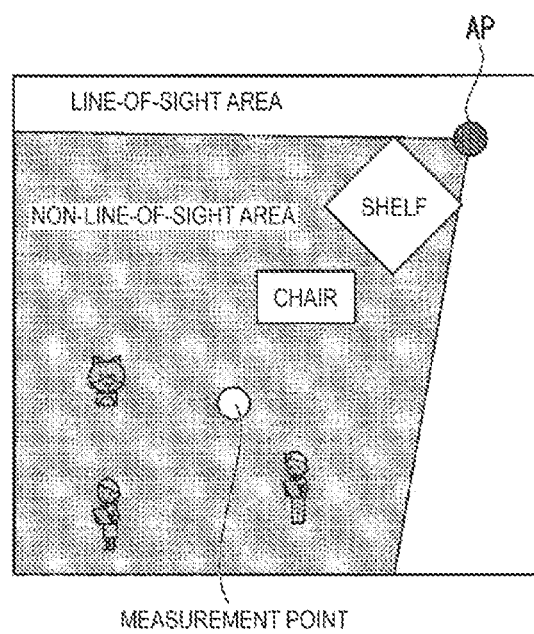
FIG. 11 is a diagram illustrating an example of an area in which a measuring robot measures a propagation environment according to a sixth embodiment.

FIG. 11 is a diagram illustrating an example of an area in which the measuring robot 1 measures a propagation environment according to the present embodiment. In a measurement target area, an access point (AP) and stationary obstacles such as a shelf and a chair are placed, and moving objects such as a person and an animal are present around the measurement point. The measuring robot 1 increases the number of acquisitions of the measurement results in a case that the measuring robot 1 detects that the moving object is present around the self-location.

Figure 12:
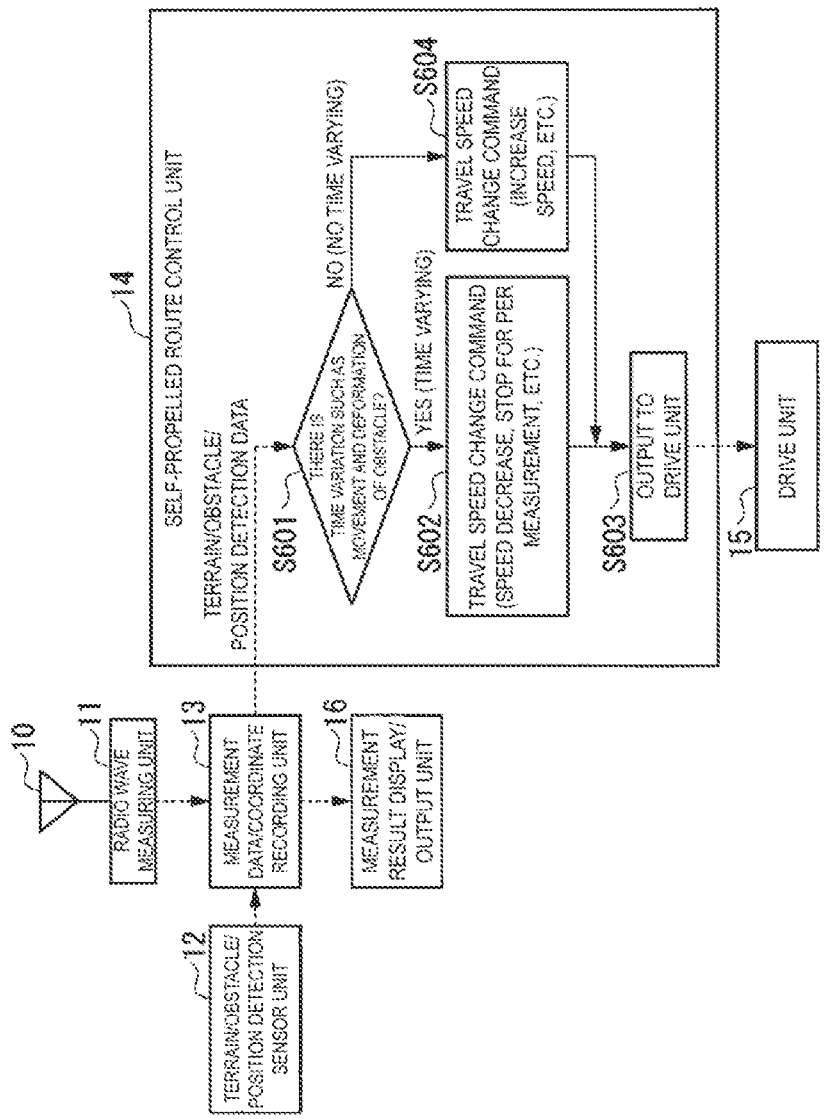
FIG. 12 is a flow diagram illustrating processing of a self-propelled route control unit according to the sixth embodiment.

FIG. 12 is a flow diagram illustrating an example of processing of the self-propelled route control unit 14 according to the present embodiment.

The radio wave measuring unit 11 outputs the measurement data of the RSSI to the measurement data/coordinate recording unit 13, and the terrain/obstacle/position detection sensor unit 12 outputs the terrain/obstacle/position detection data to the measurement data/coordinate recording unit 13. The self-propelled route control unit 14 reads out the terrain/obstacle/position detection data for a period of time, which precedes a predetermined time relative to the current self-location (measurement point). The self-propelled route control unit 14 determines whether there is a time variation in the movement and deformation of the obstacle based on the read terrain/obstacle/position detection data (step S601).

In a case that the self-propelled route control unit 14 determines that there is a time variation in the movement and deformation of the obstacle (step S601: YES), the self-propelled route control unit 14 generates a travel speed change command to reduce the travel speed or stop for measuring the PER or the like (step S602), and outputs the generated command to the drive unit 15 (step S603). In a case that the self-propelled route control unit 14 determines that there is no time variation in the movement and deformation of the obstacle (step S601: NO), the self-propelled route control unit 14 generates a travel speed change command to increase the travel speed (step S604), and outputs the generated command to the drive unit 15 (step S603).

According to the present embodiment, the measuring robot 1 can make an extensive measurement around the moving object detected by the sensor or the like.

Seventh Embodiment

In a seventh embodiment, the measuring robot 1 can make an extensive measurement in an environment in which many obstacles are present.

Figure 13:
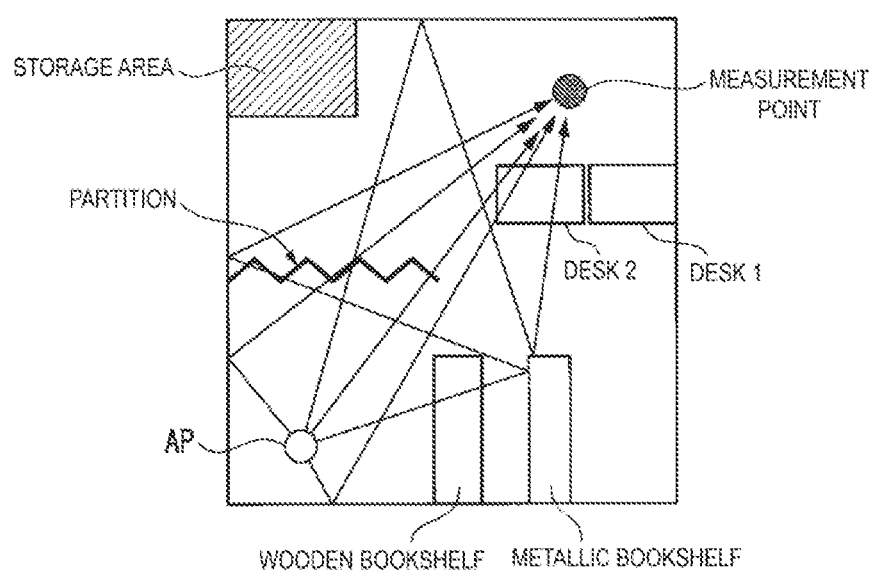
FIG. 13 is a diagram illustrating an example of an area in which a measuring robot measures a propagation environment according to a seventh embodiment.

FIG. 13 is a diagram illustrating an example of an area in which the measuring robot 1 measures a propagation environment according to the present embodiment. In a measurement target area, a storage area is provided, and in addition to the access point (AP), obstacles such as a wooden bookshelf, a metallic bookshelf, a partition, and a plurality of tables are placed. The arrows illustrated in the figure indicate routes of a signal, which is wirelessly transmitted by the access point and reaches a measurement point. The signal received at the measurement point is a synthesized signal of many signals transmitted from the access point and arriving at the measurement point through various routes.

Figure 14:
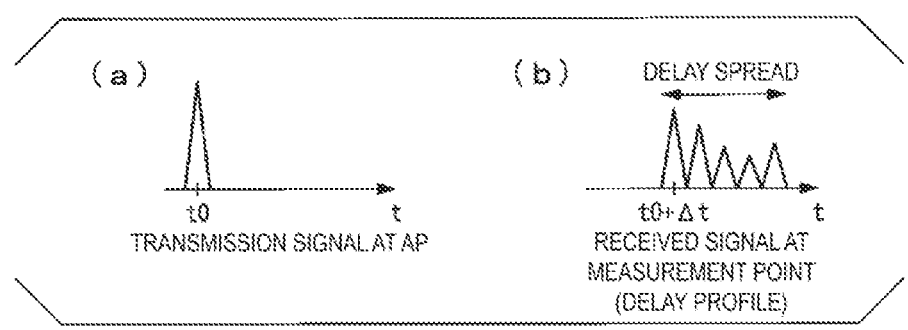
FIG. 14 is a diagram illustrating an amplitude of a transmission signal at an access point and an amplitude of a received signal at a measurement point according to the seventh embodiment.

FIG. 14 is a diagram illustrating an amplitude of a transmission signal at an access point (AP) and an amplitude of a received signal at a measurement point. FIG. 14(a) illustrates the amplitude of the transmission signal at the access point. As illustrated in FIG. 14(a), the access point transmits a radio signal at a time t0. FIG. 14(b) is a diagram illustrating a delay profile at the measurement point. As indicated by the delay profile, at the measurement point, the amplitude of the radio signal transmitted from the access point is first detected after a delay time $\Delta t$ elapses from a time t0. When many obstacles are present, the number of the delayed arrival waves increases because of many occurrences of reflection, absorption, and diffraction, and the received signals spread over the time axis. As such, the measuring robot 1 according to the present embodiment determines reliability based on the spread of the delay of the received signal, and makes the extensive measurement in a case that the reliability is low.

Figure 15:
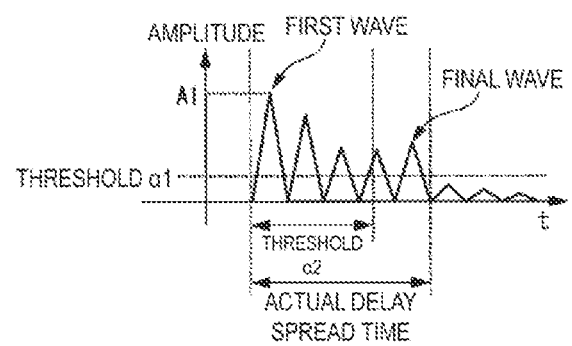
FIG. 15 is a diagram explaining reliability determination by a measuring robot according to the seventh embodiment.

FIG. 15 is a diagram explaining reliability determination by the measuring robot 1 according to the present embodiment. FIG. 15 illustrates an amplitude of a received signal at a measurement point. The large delay spread indicates a state in which radio waves synthesized of a plurality of signals different in a phase are received in a multipath environment. For this reason, if the phase relationship changes slightly, the communication quality (such as the PER) is likely to deteriorate. Then, in a case that the amplitude is equal to or more than the threshold $\alpha 1$ and the delay spread of the signal is equal to or more than the threshold $\alpha 2$, the measuring robot 1 determines that the reliability is low, and makes the extensive measurement (measurement of the PER or like). The delay spread is from an arrival time of a first wave to an arrival time of a final wave, whose amplitudes are equal to or more than the threshold $\alpha 1$. Note that the threshold $\alpha 1$ may be a fixed value, and may be defined by $\alpha 1 = A1 \times 1/c$, where an amplitude A1 of the first wave is used as a reference (c is a constant).

Figure 16:
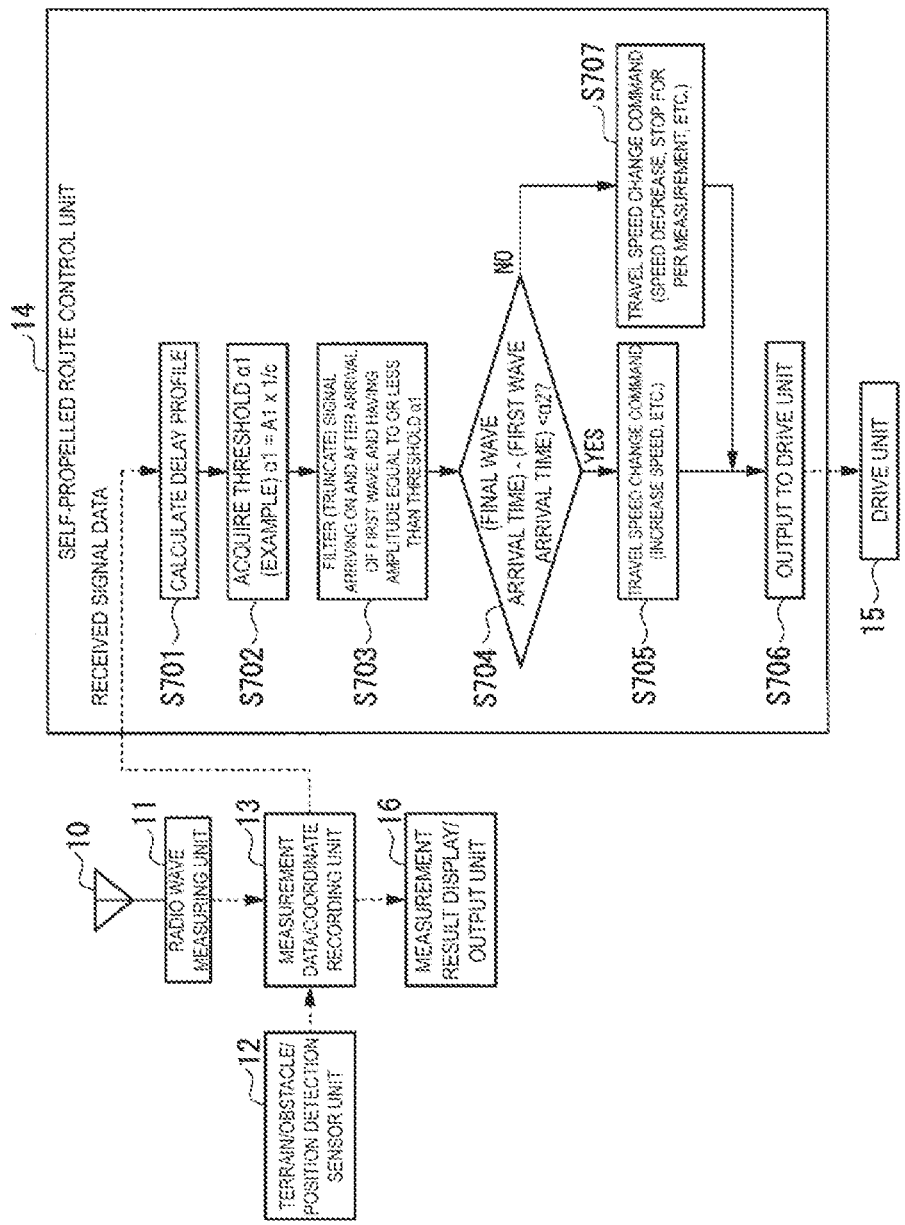
FIG. 16 is a flow diagram illustrating processing of a self-propelled route control unit according to the seventh embodiment.

FIG. 16 is a flow diagram illustrating an example of processing of the self-propelled route control unit 14 according to the seventh embodiment. The self-propelled route control unit 14 reads out the measurement data at the measurement point from the measurement data/coordinate recording unit 13, and calculates the delay profile illustrated in FIG. 14(*b*) from the read measurement data (step S701). The self-propelled route control unit 14 acquires the threshold $\alpha 1$ (step S702). For example, the self-propelled route control unit 14 calculates $\alpha 1 = A1 \times 1/c$. The self-propelled route control unit 14 filters out a signal from the delay profile, the signal arriving on and after arrival of the first wave and having an amplitude equal to or less than the threshold $\alpha 1$ (step S703). The self-propelled route control unit 14 acquires the arrival time of the first wave and the arrival time of the final wave from the filtered delay profile. The self-propelled route control unit 14 determines whether or not an arrival time delay spread calculated by subtracting the arrival time of the first wave from the arrival time of the final wave is less than a predetermined threshold $\alpha 2$ (step S704).

In a case that the self-propelled route control unit 14 determines that the arrival time delay spread is less than the threshold $\alpha 2$ (step S704: YES), the self-propelled route control unit 14 generates a travel speed change command to increase the travel speed (step S705), and outputs the generated command to the drive unit 15 (step S706). On the other hand, in a case that the self-propelled route control unit 14 determines that the arrival time delay spread is equal to or more than the threshold $\alpha 2$ (step S704: NO), the self-propelled route control unit 14 generates a travel speed change command to reduce the travel speed or stop for measuring the PER (step S707), and outputs the generated command to the drive unit 15 (step S706).

According to the present embodiment, the measuring robot 1 can make the extensive measurement at the measurement point where the obstacles are determined to be many in accordance with the delay profile.

Eighth Embodiment

In an eighth embodiment, in the case that the measuring robot 1 determines that reliability is low from the spread of an arrival angle of the received signal, the measuring robot 1 makes the extensive measurement.

Figure 17:
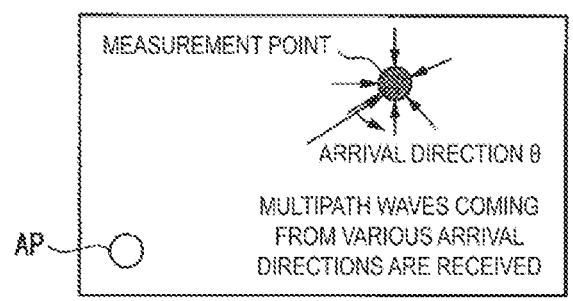
FIG. 17 is a diagram illustrating an arrival direction of a received signal at a measurement point according to an eighth embodiment.

FIG. 17 is a diagram illustrating an arrival direction of a received signal at a measurement point. At the measurement point, multipath waves are received from various arrival directions. A large spread of the arrival direction indicates a state in which radio waves synthesized of a plurality of signals different in a phase are received in a multipath environment. If the phase relationship changes slightly, the communication quality (such as the PER) is likely to deteriorate. As such, the measuring robot 1 quantizes an angle in the arrival direction into a plurality of bins, and calculates a ratio of a bin having the highest amplitude to other bins.

Figure 18:
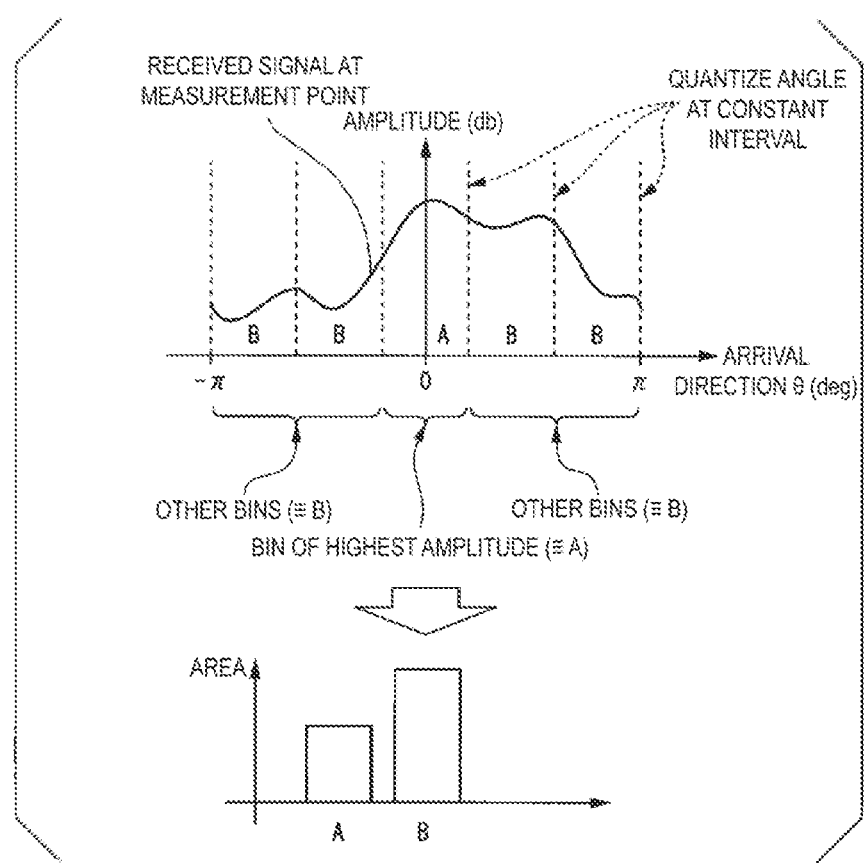
FIG. 18 is a diagram illustrating a relationship between an arrival direction and an amplitude of a received signal at a measurement point according to the eighth embodiment.

FIG. 18 is a diagram illustrating a relationship between an arrival direction and an amplitude of a received signal at a measurement point. In the figure, an arrival direction $\theta$ [deg] is quantized (divided) into five bins from $-\pi$ to $\pi$. A bin having the highest amplitude is denoted by A and other bins are denoted by B. The bins B correspond to received signals caused by reflection waves or the like. The measuring robot 1 calculates an area of each of the bin A and the bins B. If the ratio of a total area of the bins B to the area of the bin A is not less than a certain value, the measuring robot 1 determines a multipath environment and makes the extensive measurement. Here, the measuring robot 1 makes the extensive measurement if the area of the bin A is smaller than a threshold $\alpha \times$ the total area of the bins B. The threshold $\alpha$ is a constant. Note that the method of estimating the arrival direction includes a general signal processing method, a method of mechanically rotating a highly directional antenna, or the like.

Figure 19:
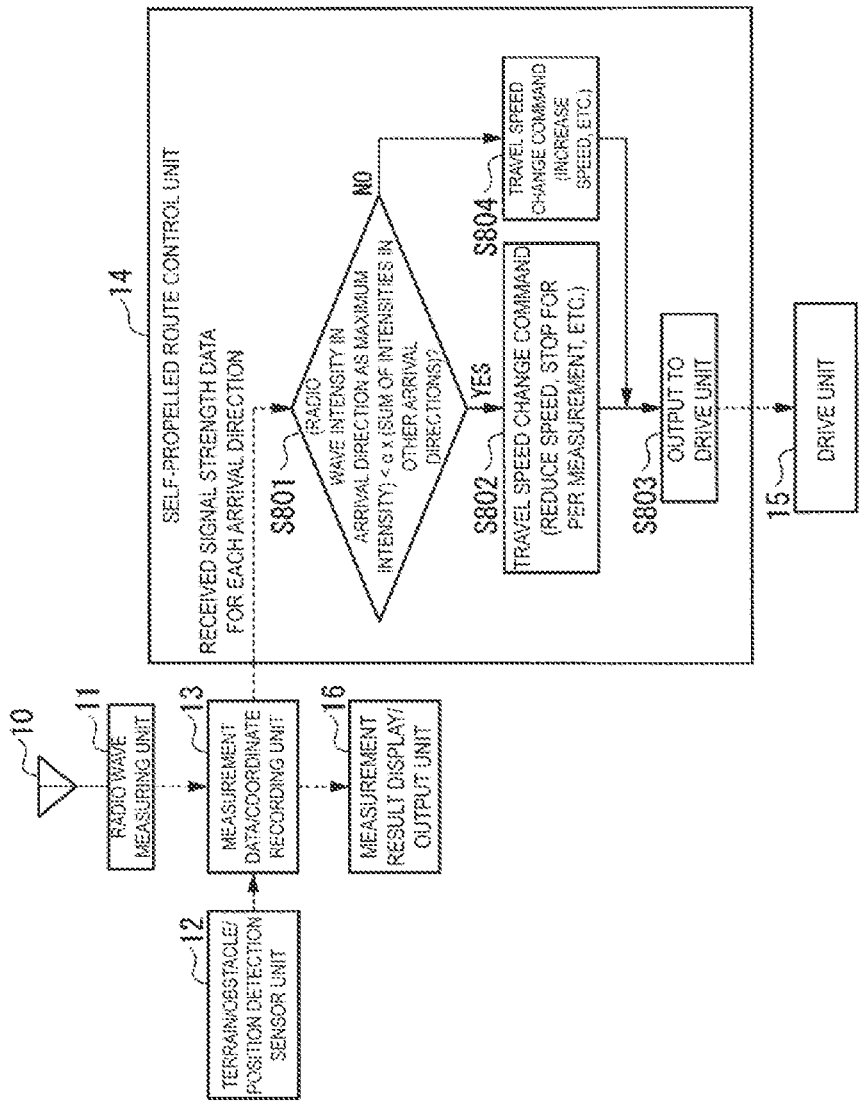
FIG. 19 is a flow diagram illustrating processing of a self-propelled route control unit according to the eighth embodiment.

FIG. 19 is a flow diagram illustrating an example of processing of the self-propelled route control unit 14 according to the present embodiment.

The self-propelled route control unit 14 reads out the measurement data at the measurement point from the measurement data/coordinate recording unit 13 (step S801). The self-propelled route control unit 14 acquires received signal strength data for each arrival direction from the measurement data. The self-propelled route control unit 14 calculates an area of each bin, that is, the radio wave intensity, from the received signal strength data for each arrival direction. The self-propelled route control unit 14 determines whether or not the radio wave intensity of the bin A in the arrival direction, which is the maximum intensity, is less than a sum of the threshold $\alpha \times$ the radio wave intensities of the respective bins B in other arrival directions (step S801).

In a case that the self-propelled route control unit 14 determines that the radio wave intensity of the bin A is less than the sum of the threshold $\alpha \times$ the radio wave intensities of the respective bins B (step S801: YES), the self-propelled route control unit 14 generates a travel speed change command to reduce the travel speed or stop for measuring the PER (step S802), and outputs the generated command to the drive unit 15 (step S803). On the other hand, in a case that the self-propelled route control unit 14 determines that the radio wave intensity of the bin A is equal to or more than the sum of the threshold $\alpha \times$ the radio wave intensities of the respective bins B (step S801: NO), the self-propelled route control unit 14 generates a travel speed change command to increase the travel speed (step S804), and outputs the generated command to the drive unit 15 (step S803).

According to the present embodiment, the measuring robot 1 can make the extensive measurement in a case of determining a multipath environment because the spread of the arrival angle of the received signal is large.

Ninth Embodiment

In order to accurately determine the communication area, the measurement of the packet error rate (PER), which is an indicator of communication quality, is required rather than the signal strength (RSSI). However, because the PER is determined by repeated measurements, it takes time compared to the RSSI, which is determined by a single measurement. As such, the measuring robot 1 according to the first embodiment determines whether or not it is necessary to measure a detailed measurement item, such as the PER at the measurement point at which the RSSI value is obtained, based on a comparison between the measured RSSI value and the threshold.

The RSSI value used for the comparison with the threshold may be determined by a single measurement, but statistics of the RSSI values determined by a plurality of measurements may be used. The present embodiment is a modification example of the first embodiment in which the RSSI is measured a plurality of times at each measurement point. Specifically, the measuring robot 1 according to the present embodiment measures the RSSI a few times at each measurement point, and estimates stability of the communication using an RSSI range defined by an average value and the standard deviation of the measured RSSI values. The measuring robot 1 measures the PER at the measurement point in a case where it is determined that the extensive measurement is necessary based on an estimation result, or travels to the next measurement point in a case where it is determined that the extensive measurement is not necessary based on the estimation result. This reduces the number of measurements and shortens the measurement time as compared to measuring the detailed measurement items at all measurement points in the area.

Figure 20:
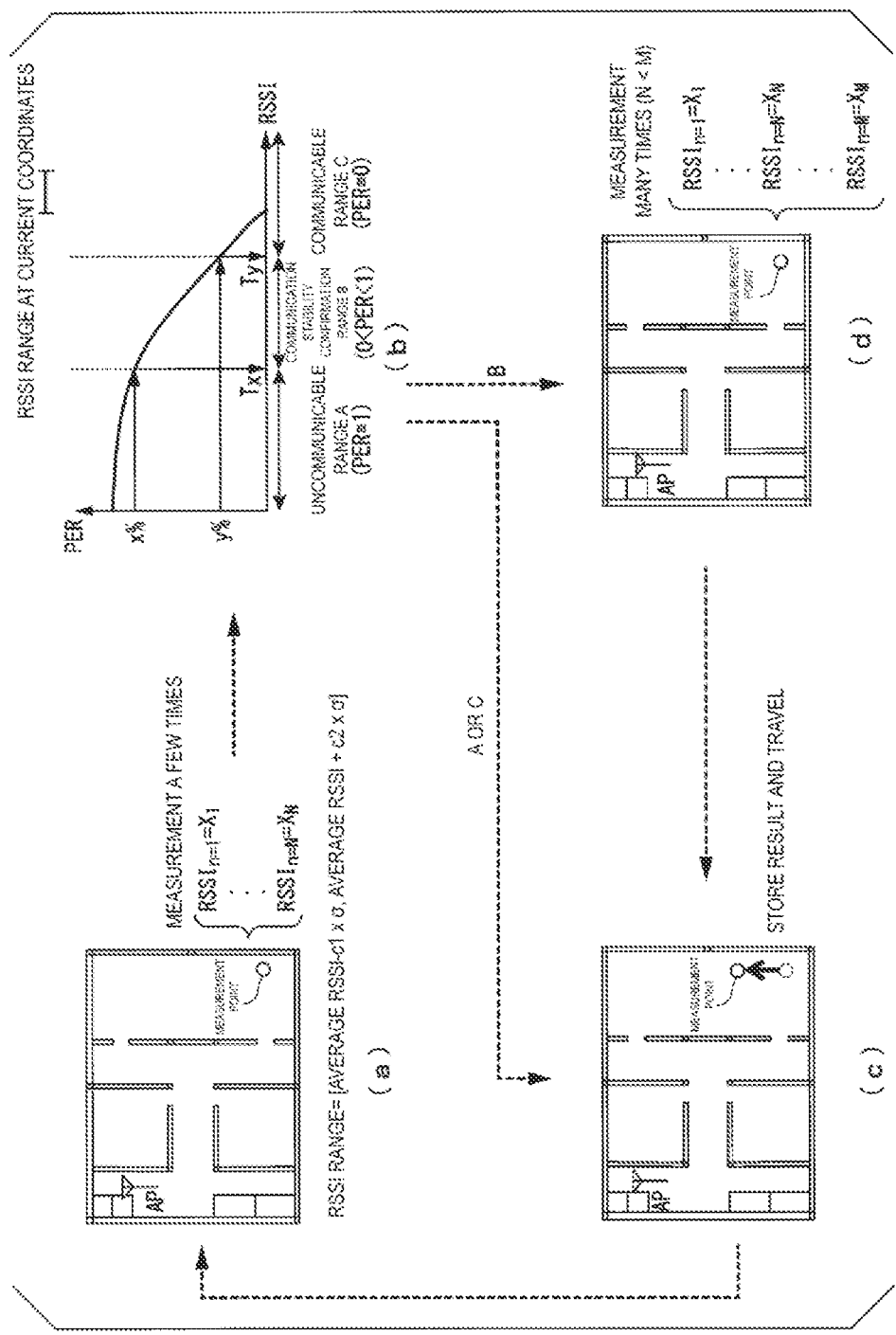
FIG. 20 is a diagram explaining an outline operation of a measuring robot according to a ninth embodiment.

FIG. 20 is a diagram explaining an outline operation of the measuring robot 1 according to the present embodiment. As illustrated in FIG. 20(*a*), the radio wave measuring unit 11 in the measuring robot 1 makes the RSSI measurement at current coordinates (current measurement point) only N times, where N is a small number. The self-propelled route control unit 14, by use of the average RSSI, which is the average value of the RSSI values $X_1, X_2, \ldots, X_N$ obtained by each measurement and the standard deviation a, calculates the RSSI range=[average RSSI−c1×standard deviation σ, average RSSI+c2× standard deviation σ], c1 and c2 are real numbers equal to or more than 0. For example, c1=c2=1 holds.

FIG. 20(*b*) is a diagram illustrates a PER-RSSI expectation curve. The PER-RSSI expectation curve represents a correspondence relationship between the PER and the RSSI If the PER exceeds x % and is closer to 1, communication is not possible. Then, the RSSI value corresponding to the PER of x % in the PER-RSSI expectation curve is set as a lower threshold $T_x$. In a case that the entire RSSI range is equal to or less than the lower threshold $T_x$, the self-propelled route control unit 14 determines that the current measurement point is in an uncommunicable range A and that communication is not possible. In this case, as illustrated in FIG. 20(*c*), the self-propelled route control unit 14 associates the coordinate position and time information of the measurement point with information indicating the RSSI range and that the communication is not possible (uncommunicable range A), records the associated information in the measurement data/coordinate recording unit 13, and controls to travel to the next measurement point without making the PER measurement.

If the PER is less than y % and closer to 0, communication is possible. Then, the RSSI value corresponding to the PER of y % in the PER-RSSI expectation curve illustrated in FIG. 20(*b*) is set as an upper threshold $T_y$. In a case that the entire RSSI range is equal to or more than the upper threshold $T_y$, the self-propelled route control unit 14 determines that the current measurement point is in a communicable range C and that communication is stable. In this case, as illustrated in FIG. 20(*c*), the self-propelled route control unit 14 associates the coordinate position and time information of the measurement point with information indicating the RSSI range and that the communication is stable (communicable range C), records the associated information in the measurement data/coordinate recording unit 13, and controls to travel to the next measurement point without making the PER measurement.

On the other hand, in a case that even a portion of the RSSI range falls in a communication stability confirmation range B that is from the lower threshold $T_x$ to the upper $T_y$, the self-propelled route control unit 14 determines that communication stability needs to be determined by the PER. As illustrated in FIG. 20(*d*), the self-propelled route control unit 14 measures the RSSI M times, which are more than N times (N<M) at the current coordinates, and controls the radio wave measuring unit 11 and the drive unit 15 to calculate the PER.

The PER is determined by the following equation.

PER=1−(the number *M* of packets received by receiver/number of packets transmitted by transmitter)

In the present embodiment, the receiver is the measuring robot 1, and the transmitter is, for example, the AP. In a case that the transmitter transmits 100 packets and the receiver receives 10 packets of them, PER=0.1 holds. If the number of packets transmitted is large, that is, the packet transmission is performed a plurality of times, a denominator of the above equation is large, so it is possible to obtain a PER with a higher degree of accuracy. As such, the radio wave measuring unit 11 in the measuring robot 1 measures the RSSI of the packets transmitted from the AP over a long period of time many times (M times), and calculates the PER with high accuracy from the number of packets transmitted from the AP and the number M of measured received packets.

Upon completion of the measurement of the PER, the self-propelled route control unit 14 stores the measurement results as illustrated in FIG. 20(*c*) and travels to the next measurement point. For example, the radio wave measuring unit 11 records measurement data including the measured RSSI values $X_1, X_2, \ldots, X_M$, and the PER value in the measurement data/coordinate recording unit 13. Furthermore, the self-propelled route control unit 14 associates the coordinate position and time information of the measurement point with information indicating that the communication stability confirmation is necessary (communication stability confirmation range B), and records the associated information in the measurement data/coordinate recording unit 13. After the travel as illustrated in FIG. 20(*c*), the measuring robot 1 again performs the process illustrated in FIG. 20(*a*) at the next measurement point.

The PER-RSSI expectation curve used in FIG. 20(*b*) can be obtained, for example, from measurement results of a pre-experiment in which before the measurement, the transceiver is connected directly by the cable and the PER value per the average RSSI value is determined in advance in the receiver, and the like.

Figure 21:
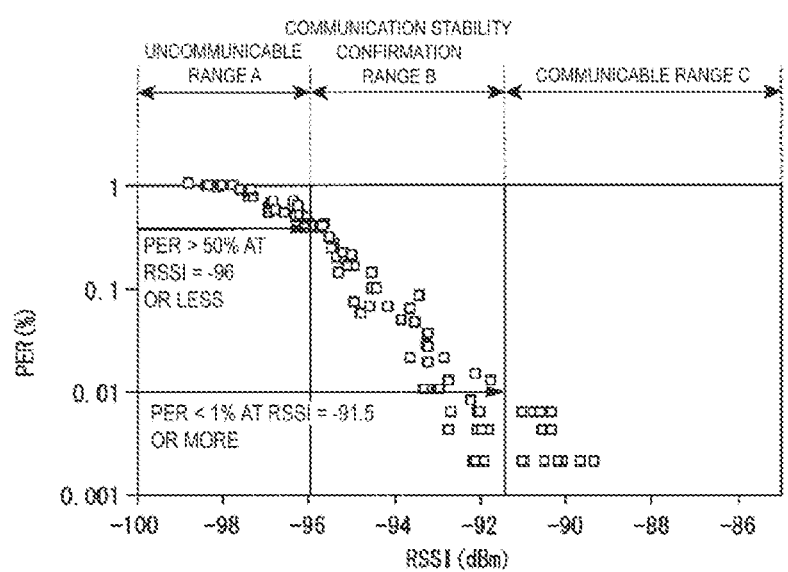
FIG. 21 is a diagram illustrating results of a pre-experiment according to the ninth embodiment.

FIG. 21 is a diagram illustrating results of a pre-experiment. For example, the communication stability confirmation range B is set as 1%≤PER≤50%. As a result of the pre-experiment, in a case that a result is always obtained that PER>50% at the average RSSI=−96 or less, and PER<1% at the average RSSI=−91.5 or more, the communication stability confirmation range B is determined to be −96<RSSI<−91.5. That is, it is assumed that the threshold $T_x$=−96 and the threshold $T_y$=−91.5. It is determined to be the uncommunicable range A if the RSSI<−96, and it is determined to be the communicable range if the RSSI>−91.5.

FIG. 22 is a diagram summarizing processing procedures illustrated in FIG. 20. Ina procedure 1, the self-propelled route control unit 14 classifies the RSSI range calculated based on the actual measured values of the RSSI into one of a class A, a class B, and a class C, where the class A is defined as a class in which all falls within the uncommunicable range A, the class B is defined as a class in which a part or all falls within the communication stability confirmation range B, and the class C is defined as a class in which all falls within the communicable range. In a procedure 2, the self-propelled route control unit 14 determines the stability of the communication based on the classification results in the procedure 1. Specifically, the self-propelled route control unit 14 determines that communication is not possible in the case of the class A, determines that communication stability needs to be determined by the PER (the communication stability confirmation is necessary) in the case of the class B, and determines that communication is stable in the case of the class C. In a procedure 3, the self-propelled route control unit 14 stores the determination result in the measurement data/coordinate recording unit 13. In a procedure 4, the self-propelled route control unit 14 performs the following process in accordance with the determination result in the procedure 2. Specifically, the self-propelled route control unit 14 controls, in the case of the class A or the class C, to travel to the next measurement point without making the PER measurement. The self-propelled route control unit 14 controls, in the case of the class B, to additionally make the PER measurement. After the procedure 4, the processes from the procedure 1 are performed at the measurement point after the travel. Note that the self-propelled route control unit 14 may perform the procedure 3 in the middle of or after the procedure 4.

Figure 23:
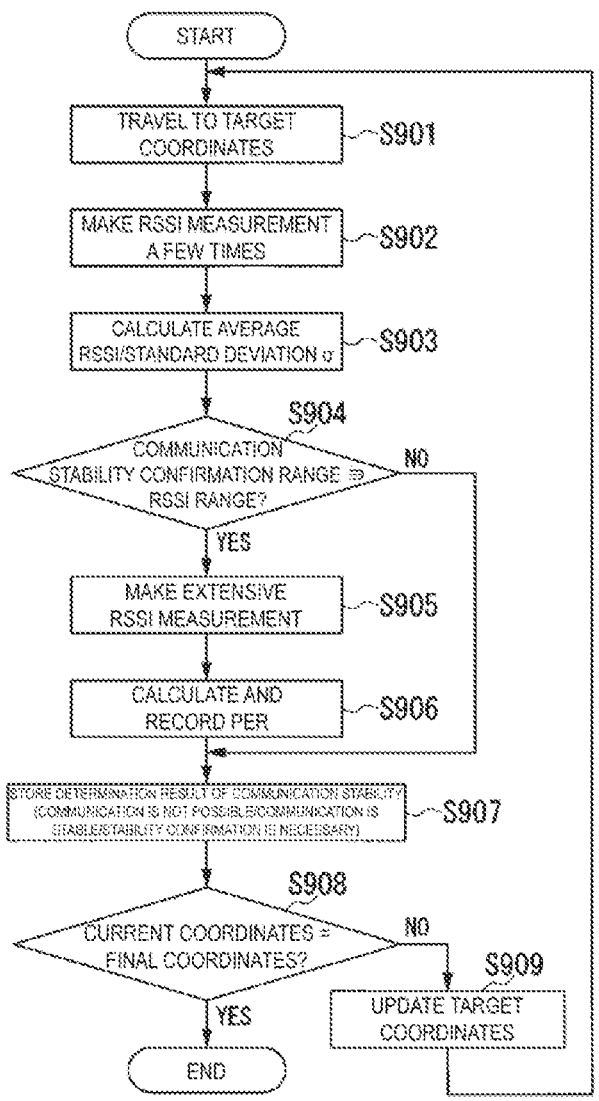
FIG. 23 is a flow diagram illustrating processing of a self-propelled route control unit according to the ninth embodiment.

FIG. 23 is a flow diagram illustrating an example of processing of the self-propelled route control unit 14 according to the present embodiment.

The self-propelled route control unit 14 controls the drive unit 15 to travel to target coordinates (step S901). After traveling to the target coordinates, the self-propelled route control unit 14 instructs the radio wave measuring unit 11 to make a few times of RSSI measurements. The radio wave measuring unit 11 measures the RSSI a few times in accordance with the instruction from the self-propelled route control unit 14, and records the measurement data indicating the measurement results in the measurement data/coordinate recording unit 13 (step S902). The self-propelled route control unit 14 reads out the RSSI values measured at the current coordinates from the measurement data/coordinate recording unit 13, and calculates the average RSSI and the standard deviation a (step S903) of the RSSI values. The self-propelled route control unit 14 calculates the RSSI range using the average RSSI and the standard deviation a calculated in step S903, and determines whether or not at least a portion of the RSSI range falls within in the communication stability confirmation range B (step S904).

In a case that the self-propelled route control unit 14 determines that a portion or all of the RSSI range falls within the communication stability confirmation range B (step S904: YES), the self-propelled route control unit 14 instructs the radio wave measuring unit 11 to make the extensive RSSI measurement (step S905). The term "extensive" means, for example, that the RSSI measurement is made many times more than in step S902. The radio wave measuring unit 11 calculates the PER using the packet for the RSSI measurement in step S905 (step S906). The radio wave measuring unit 11 records, in the measurement data/coordinate recording unit 13, the measurement data in which the RSSI value measured in step S905 and the PER measured in step S906 are set (step S906).

Ina case that the self-propelled route control unit 14 determines that none of the RSSI range falls within in the communication stability confirmation range B (step S904: NO), or after step S906, the self-propelled route control unit 14 records, in the measurement data/coordinate recording unit 13, the determination result of the communication stability using the RSSI range (communication is not possible/communication is stable/stability confirmation is necessary) (step S907). The self-propelled route control unit 14 determines whether or not the current coordinates are final coordinates of the measurement route (step S908). In a case that the self-propelled route control unit 14 determines that the current coordinates are not the final coordinates of the measurement route (step S908: NO), the self-propelled route control unit 14 updates the target coordinates, and outputs a control signal to the drive unit 15 to indicate the travel to the updated target coordinates (step S909). After the travel, the self-propelled route control unit 14 performs the processes from step S901. Then, in a case that the self-propelled route control unit 14 determines that the current coordinates are the final coordinates of the measurement route (step S908: YES), the self-propelled route control unit 14 ends the measurement process.

Note that in the above description, the case in which the PER is measured is described as an example, but the BAR may be measured.

According to the embodiment described above, the measuring robot 1 that observes the radio wave environment while traveling can determine an efficient self-propelled route for making highly accurate radio wave measurement in a limited time, in which an extensive measurement is made at a location where communication reliability is low and a regular or simple measurement is made at a location where communication reliability is high. For search at the location where communication reliability is low, for example, one or more of the followings can be used: the RSSI, the signal powers of signals of a plurality of channels, the LOS:NLOS determination results, the delay profile, the radio wave arrival direction, and a proximity sensor (e.g., a distance detection device such as an ultrasonic sensor, an obstacle and position detection device such as a GPS and an infrared sensor, and the like).

For example, in a case that the RSSI is used for the search at the location where reliability is low, the measuring robot 1 measures the reception level at the measurement point where the RSSI value is equal to or more than the threshold or the variation of the RSSI value is equal to or less than the threshold. And the measurement robot 1 considers the possibility that the communication quality is likely to be low, and measures the BER, the PER, and the like in addition to the RSSI at the measurement point where the RSSI value is less than the threshold or the variation of the RSSI value is larger than the threshold. In addition, the measuring robot 1 makes an extensive measurement, because reliability is likely to be low, at the measurement point where it is determined to be a multipath rich environment, or a non-multipath rich environment and a non-line-of-sight based on the measurement result of the reception level of each of the signals of the plurality of channels. In addition, the measuring robot 1 acquires the delay profile based on the measurement results of the reception levels, and in a case that the delay time spread for the amplitude equal to or more than the first threshold in the delay profile is equal to or larger than the second threshold, determines that the obstacles is many and reliability is low, and makes an extensive measurement. Thus, the measurement and collection method that has been conventionally performed through the determination by the person can be normalized by the measuring robot based on the acquired information to allow automatic determination.

In the simulation-based methods and statistical models of the related art, errors occur in the estimation of the BER and the PER because reality of material properties, invisible areas, and the like cannot be sufficiently simulated. On the other hand, the actual measured value also incorporates the effects of the material properties of a substance in the propagation path, and an invisible portion under a roof and the like. In the first, second, third, seventh, eighth, and ninth embodiments described above, based on the actual measured values, the reliability is determined as to whether the BER and the PER are high enough for possible communication, or too low to perform communication. And, for the measurement point with high reliability, the BER and the PER are not measured and for the measurement point with low reliability, the BER and the PER are measured and thus, the extensive measurement is made. Accordingly, it is possible to obtain more accurate information on the propagation environment of the radio waves across the measurement target area as compared to the simulation-based methods or the statistical models.

Note that the measuring robot 1 includes a central processing unit (CPU), a memory, an auxiliary storage device, and the like connected via a bus, and executes a program to function as an apparatus including the measurement data/coordinate recording unit 13, the self-propelled route control unit 14, and the measurement result display/output unit 16. Some or all of the functions of the measurement data/coordinate recording unit 13, the self-propelled route control unit 14, and the measurement result display/output unit 16 may be implemented by use of hardware such as an Application Specific Integrated circuit (ASIC), a Programmable Logic Device (PLD), and a Field Programmable Gate Array (FPGA). The program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The program may be transmitted over an electrical communication line.

Note that the self-propelled route control unit 14 in the measuring robot 1 may display information on a display or the like, the information being used in the determination processing of whether to make an extensive measurement and may receive information input of a result of checking the displayed information and determining whether to make an extensive measurement by the measurer. The information used in the determination processing of whether to make an extensive measurement is, for example, the information used in the determination processing in step S102 in FIG. 3, step S203 in FIG. 4, step S305, step S306, and step S310 in FIG. 6, step S401 in FIG. 8, step S501 in FIG. 10, step S602 in FIG. 12, step S704 in FIG. 16, step S801 in FIG. 19, or step S904 in FIG. 23.

Furthermore, the propagation environment recognition apparatus may be an apparatus having functions of the measuring robot 1 excluding the function related to the traveling. In this case, the propagation environment recognition apparatus performs the processing and operation described in each of the above-described embodiments by means of a fixed-point observation. The measurer may move the propagation environment recognition apparatus within the measurement target area.

According to the above-described embodiments, the propagation environment recognition apparatus that measures an electromagnetic wave includes a measuring unit and a control unit. For example, the propagation environment recognition apparatus is the measuring robot 1, the measuring unit is the radio wave measuring unit 11, and the control unit is the self-propelled route control unit 14. The measuring unit measures an electromagnetic wave at a measurement point. For example, the measuring unit may measure the electromagnetic wave at a plurality of measurement points on a route along which the propagation environment recognition apparatus travels. The control unit controls, in a case that reliability of communication using the radio wave at the measurement point is determined to be low based on one or more of a measurement result by the measuring unit and information on an obstacle detected by a sensor, to measure the electromagnetic wave more precisely compared to the measurement of the electromagnetic wave in a case that reliability of communication using the electromagnetic wave at the measurement point is determined to be high. For example, the sensor is the terrain/obstacle/position detection sensor unit 12.

The control unit precisely measures the electromagnetic wave by performing control including: in the case that the reliability at the measurement point is determined to be low, increasing the number of measurement points in a surrounding area to exceed the number of the measurement points in the case that the reliability is determined to be high; measuring another measurement item in addition to a measurement item of the electromagnetic wave for the case that the reliability is determined to be high; or measuring another measurement item different from the measurement item for the case that the reliability is determined to be high.

The control unit may determine the reliability of the communication at the measurement point using one or more of: a reception level (e.g. RSSI) of the electromagnetic wave, a reception level at each of a plurality of frequencies, whether or not a line-of-sight from a source of the electromagnetic wave is established at the measurement point, a delay profile of the electromagnetic wave, an arrival direction of the electromagnetic wave reception, and a position, shape, material, and movement of the obstacle detected by the sensor. In addition, the control unit may perform control including determining the reliability of the communication in accordance with the reception level (for example, RSSI) measured by the measuring unit at the measurement point, and then, measuring only the reception level at the measurement point where the reliability of the communication is determined to be high, and measure an error rate such as the BER and the PER in addition to the reception level in the case that the reliability of the communication is determined to be low. The control unit may calculate the delay profile at the measurement point using the measurement result from the measuring unit, and determine the reliability of the communication based on a delay time spread indicated by the calculated delay profile.

This allows the propagation environment recognition apparatus to optimize the measurement items and measurement time of the electromagnetic wave measurement, and efficiently perform high-precision measurements.

The embodiments of the present invention have been described above in detail with reference to the drawings. However, specific configurations are not limited to those embodiments, and include any design or the like within the scope not departing from the gist of the present invention.

INDUSTRIAL APPLICABILITY

It is available for an apparatus that makes a measurement in radio wave environments.

REFERENCE SIGNS LIST

1 . . . Measuring robot
10 . . . Antenna
11 . . . Radio wave measuring unit
12 . . . Terrain/obstacle/position detection sensor unit
13 . . . Measurement data/coordinate recording unit
14 . . . Self-propelled route control unit
15 . . . Drive unit
16 . . . Measurement result display/output unit

The invention claimed is:

1. A propagation environment recognition method performed by a propagation environment recognition apparatus for measuring an electromagnetic wave, the propagation environment recognition method comprising:
performing measurement of an electromagnetic wave at a measurement point; and
performing control including, calculating a delay profile at the measurement point using the measurement result from the performing the measurement,
determining the reliability of the communication based on a delay time spread indicated by the calculated delay profile, and in a case that reliability of communication using the electromagnetic wave at the measurement point is determined to be low based on one or more of a measurement result from the performing the measurement of the electromagnetic wave and information on an obstacle detected by a sensor, performing measurement of the electromagnetic wave more precisely compared to measurement of the electromagnetic wave in a case that the reliability of the communication using the electromagnetic wave is determined to be high.

2. The propagation environment recognition method according to claim 1,
wherein, in the case that the reliability at the measurement point is determined to be low, the performing control includes: increasing the number of measurement points in a surrounding area to exceed the number of the measurement points in the case that the reliability is determined to be high; measuring another measurement item in addition to a measurement item of the electromagnetic wave for the case that the reliability is determined to be high; or measuring another measurement item different from the measurement item for the case that the reliability is determined to be high.

3. The propagation environment recognition method according to claim 1,
wherein the performing the measurement includes measuring the electromagnetic wave at a plurality of measurement points on a route along which the propagation environment recognition apparatus travels.

4. A propagation environment recognition apparatus comprising:
one or more antennas configured to measure an electromagnetic wave at a measurement point; and
a processor configured to execute computer-readable instructions to:
calculate a delay profile at the measurement point using the measurement result from the performing the measurement,
determine the reliability of the communication based on a delay time spread indicated by the calculated delay profile, and control,
in a case that reliability of communication using the electromagnetic wave at the measurement point is determined to be low based on one or more of a measurement result by the measuring unit and information on an obstacle detected by a sensor, the one or more antennas to measure the electromagnetic wave more precisely compared to the measurement of the electromagnetic wave in a case that the reliability of the communication using the electromagnetic wave is determined to be high.

5. The propagation environment recognition apparatus of claim 4, wherein the processor is configured, in the case that the reliability at the measurement point is determined to be low, to increase the number of measurement points in a surrounding area to exceed the number of the measurement points in the case that the reliability is determined to be high; to measure another measurement item in addition to a measurement item of the electromagnetic wave for the case that the reliability is determined to be high; or to measure another measurement item different from the measurement item for the case that the reliability is determined to be high.

6. The propagation environment recognition apparatus of claim 4, wherein the one or more antennas are configured to measure the electromagnetic wave at a plurality of measurement points on a route along which the propagation environment recognition apparatus travels.

* * * * *